(12) United States Patent
Mawet

(10) Patent No.: US 7,323,863 B2
(45) Date of Patent: Jan. 29, 2008

(54) INDUCTIVE TRANSDUCER MEASUREMENT SYSTEM

(75) Inventor: Patrick Mawet, Snohomish, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 130 days.

(21) Appl. No.: 11/251,482

(22) Filed: Oct. 14, 2005

(65) Prior Publication Data

US 2007/0085530 A1    Apr. 19, 2007

(51) Int. Cl.
*G01B 7/14* (2006.01)
*H01F 5/00* (2006.01)

(52) U.S. Cl. .............................. 324/207.15; 324/207.16

(58) Field of Classification Search ...............................
324/207.16–207.19, 207.23, 207.24, 207.22;
33/708
See application file for complete search history.

(56) References Cited

U.S. PATENT DOCUMENTS

| | | | |
|---|---|---|---|
| 5,327,078 A * | 7/1994 | Mori | 324/207.24 |
| 5,712,563 A * | 1/1998 | Kawagoe et al. | 324/207.19 |
| 5,804,963 A | 9/1998 | Meyer | |
| 5,886,519 A | 3/1999 | Masreliez et al. | |
| 5,901,458 A | 5/1999 | Andermo et al. | |
| 6,859,762 B2 | 2/2005 | Mawet | |
| 2004/0085063 A1 * | 5/2004 | Jin et al. | 324/207.16 |

* cited by examiner

*Primary Examiner*—Reena Aurora
*Assistant Examiner*—Kenneth J Whittington
(74) *Attorney, Agent, or Firm*—Christensen O'Connor Johnson Kindness PLLC

(57) ABSTRACT

An inductive transducer measurement system is provided. A measuring circuit simultaneously drives a plurality of transducer windings and measures their inductance by using a load impedance in an inductance measurement circuit configuration. The system may be designed such that a circuit characteristic that includes a measurement period value, a winding inductance value, and a non-inductive impedance value in series with the winding inductance, is set at a nominal value that suppresses a second harmonic error component that is inherent in the measuring circuit. When a three-phase winding configuration is used, preferred signal processing techniques may be used to cancel third harmonic errors in the system, which in combination with the second harmonic error suppression technique creates a variable inductance measurement system that is relatively free from errors.

20 Claims, 18 Drawing Sheets

INDUCTIVE TRANSDUCER MEASUREMENT SYSTEM

FIELD OF THE INVENTION

The present invention relates to electronic measuring instruments and, more particularly, to a system for a variable inductance transducer wherein a measuring circuit simultaneously drives a plurality of transducer windings and measures their inductance.

BACKGROUND OF THE INVENTION

Various portable electronic measuring instruments are currently available. One example of such an instrument is a displacement measuring instrument, such as a hand-held electronic caliper which can be used for making precise measurements of machined parts to ensure that they are meeting tolerance requirements.

An example of an electronic caliper using highly accurate measuring techniques is shown in U.S. Pat. No. 5,901,458, which is commonly assigned and hereby incorporated by reference in its entirety. As described, the electronic caliper has a reduced offset position transducer that uses a read head that is movable along a scale. The electronics provide a precise measurement of the read head's position on the scale. The transducer uses two sets of coupling loops on the scale to inductively couple a transmitter winding on the read head on a slide to one or more receiver windings on the read head. The transmitter winding generates a primary magnetic field. The transmitter winding is inductively coupled to first loop portions of first and second sets of coupling loops by a magnetic field. Second loop portions of the first and second sets of coupling loops are interleaved and generate secondary magnetic fields. A receiver winding is formed in a periodic pattern of alternating polarity loops and is inductively coupled to the second loop portions of the first and second sets of coupling loops by the secondary magnetic fields. Depending on the relative position between the read head and the scale, each polarity loop of the receiver winding is inductively coupled to a second loop portion of either the first or second set of coupling loops. The relative positions of the first and second loop portions of the first and second sets of coupling loops are periodic and dependent on the relative position of the coupling loops on the scale.

Another example is shown in U.S. Pat. No. 5,886,519, which is commonly assigned, and hereby incorporated by reference in its entirety. The '519 patent discloses an inductive absolute position transducer for high accuracy applications, such as linear or rotary encoders, electronic calipers and the like. The absolute position transducer uses two members movable relative to each other. The first member contains at least one active transmitter for generating a magnetic field and at least one receiver for receiving the generated magnetic field. The passive second member includes passive flux modulating elements that modulate the received field depending on their position relative to the at least one receiver. An electronic circuit coupled to the at least one transmitter and the at least one receiver compares the outputs of the at least one receiver, evaluates the absolute position between the two members, and exhibits the position on a display. The inductive absolute position transducer determines the absolute position between the two members.

Another example is shown in U.S. Pat. No. 5,804,963, which is hereby incorporated by reference in its entirety. FIGS. 3, 4, and 6 of the '963 patent have been reproduced herein as prior art FIGS. 1, 2, and 3, as will be described in more detail below. In summary, the '963 patent discloses an inductive displacement sensor comprising two elements moveable relative to each other along a path, provided with windings arranged along the path and where the inductive coupling between the windings varies as a periodic function of the relative displacement of the two elements, and electronic means for determining the value of the displacement from a measurement of the inductive coupling between the windings. As will be described in more detail below, the '963 caliper uses three identical coils, with one of the coils selected as a primary (transmitter). The other two are selected as secondaries (receivers) and the output is measured differentially. The scale causes spatially periodic variations of the mutual inductance between the coils. The 3 coils are multiplexed and switched or "selected" to be either a primary or a secondary ("rotated") 3 times to create 3 phases. The selected primary coil is driven by a 25 nS pulse. At the end of the pulse, the selected receiver outputs are sampled and processed. The 3 phase outputs are taken in regular intervals and used to create a "staircase" signal that is filtered, using a phase measurement technique.

As shown in FIG. 1, in the '963 caliper a first element or cursor 31 with N=3 interlaced meander windings 31A, 31B, 31C, of pitch 2T and successively shifted by 2T/3, faces a second element or scale 32, including a conducting tape featuring a row of windows 321 and traverses 322 on a pitch T. It can be seen that the first element's 31 windings 31A, 31B, 31C are implemented on two metal layers so they may cross each other. Passage, or ohmic contact, from one meander layer to the other is done via contacts 310.

As shown in FIG. 2, in an alternate embodiment of the '963 caliper, windings 41A, 41B, 41C, are formed by two meanders whose linear sections running across the x direction are superposed, resulting in a fourfold inductance over the same area. The inducting or induced currents have the same direction in the superposed linear sections, as shown by arrows in winding 41B, enhanced in FIG. 2. As the meanders of each winding go back and forth, i.e., start and finish at the same end, all connections are at one end, minimizing stray inductance and radiation. The windings in FIG. 2 are tapered towards the ends to equalize their mutual inductances and to reduce this finite length configuration's sensitivity to misalignment in linear sensors. In rotary versions, this can also be achieved by distributing the windings over the whole perimeter.

As shown in FIG. 3, in one embodiment of the electronic circuitry for the '963 caliper, three meander windings A, B, C, having different spatial phases, are provided. They are Y-connected, i.e., with one terminal each on a common contact, connected to a positive voltage V+, which may be the circuit's supply voltage. The remaining terminals LA, LB, LC, are respectively connected to driver transistors TA, TB, TC, to surge absorbing diodes DA, DB, DC, and to identically named terminals LA, LB, LC of transmission gates or switching transistors TG. The driver transistors are N-channel MOS enhancement types.

The measuring principle of FIG. 3 is described as follows. Coupling via the scale is measured by generating a voltage pulse on winding A and simultaneously sampling the difference between the induced voltages on the other windings B and C, the inductor and induced windings being thus in quadrature, as will be seen further. This coupling varies in a spatially periodic manner, with a spatial period T, and a periodic sampled voltage sequence can thus be obtained by generating the next pulse on the following winding B and sampling the voltage difference between the next windings C, A, etc. This sequence yields three samples per period, which is sufficient to find the spatial phase of the scale that influences the sampled signals. This phase is stated to vary linearly with the scale displacement as long as spatial harmonics of the coupling characteristic are negligible. This is usually the case, given that even harmonics are weak, that the third harmonic is not sampled and that those of order five and above are strongly attenuated for a sufficient gap, about 0.2 T, between the winding's and the scale's surface. It is stated that spatial harmonics of a meander winding's electromagnetic field decrease exponentially with the gap, a harmonic of order m decreasing by half for a gap of 0.22 T/m. The signal phase may then be computed as a function of the numerical amplitude and polarity values of said three sampled voltages. It is stated that the electronic means described and illustrated in FIG. 3 determine the phase directly by filtering a signal sampled six times per period, low-pass filtering being simpler for more samples per period. The spatial harmonic three is sampled, but can be filtered. But harmonic five, on the contrary, is stated to be rejected on the fundamental by sampling, so it is attenuated before, e.g., by the shape of the meanders and the scale or simply by a sufficient gap. It is stated that in the '963 caliper the absence of windings and connections on the second element, or scale, often quite long, allows high frequency measuring signals, where the winding's impedance is higher than their ohmic resistance, thus improving the sensor's efficiency.

Systems such as those shown in the '458, '519, and '963 patents utilize advanced signal processing techniques to produce displacement measurements. However, in some of these systems, non-simultaneous measurement of the various winding signals can lead to measurement errors during motion, and/or slower measurement cycles. In some of these systems, simultaneous measurement of the various winding signals may be achieved, but may require additional size, or greater fabrication complexity and cost, in order to provide dedicated "transmitter" windings. In some of these systems, measurement signals and or signal to noise ratio may be low. A variable inductance position transducer that can overcome some or all of these problems would be desirable.

SUMMARY OF THE INVENTION

The present invention is directed to an inductive transducer measurement system. The system is suitable for operating variable inductance transducers and offers low voltage and low power operation that is desirable for portable electronic measuring instruments.

In accordance with one aspect of the invention, the need for a separate or multiplexed primary coil (transmitter coil) is eliminated by using load impedances in an inductance measurement configuration wherein a measuring circuit simultaneously drives a plurality of transducer windings and measures their inductance. The terms coil, coil winding, and winding are generally used interchangeably herein.

In accordance with one aspect of the invention, in various embodiments, the variable inductance transducer includes two or more windings that are driven by a common signal. A load impedance circuit element in series with each winding provides a means of detecting the inductance and/or mutual inductance variations that correspond to the transducer position. In one specific implementation, three coil windings are driven by the same signal and each branch has a load impedance (R or C) that creates a time domain response varying with the inductance (and/or mutual inductance) of the transducer windings. Simultaneous measurements may be taken from each branch. The inductance and/or mutual inductance that determines the measurement signals is referred to as the effective inductance herein. At any time, the effective inductance of a winding includes the nominal inductance of the winding as arranged in the transducer and the variation in inductance that depends on the position of the transducer scale relative to the transducer windings.

In accordance with another aspect of the invention, a pulsed driver is utilized to drive the inductive sensor. In one embodiment, the driver pulse is a square wave and the measurement circuit does not require a special timing circuit, in that signal measurements are easily is synchronized with the driving pulse. By keeping the pulse at a relatively short duration, power requirements are minimized. In various embodiments where an RL circuit is utilized, the R is made to be low enough to prevent a loss in coil voltage at the end of the pulse, which coincides with the signal measurements. One benefit of this configuration is that a sample and hold circuit used for signal measurement can be directly synchronized with the end of the drive pulse, without requiring an special delay or timing circuit.

In accordance with another aspect of the invention, in an embodiment where three windings are utilized, preferred signal processing techniques are utilized to cancel most of the third harmonic error components in the system.

In accordance with another aspect of the invention, in one embodiment, a second harmonic error component, which would otherwise be present in the measurement signals, is canceled by using a selected relationship between a measurement time delay (relative to the start of a driver signal input to the windings), a nominal winding inductance, and a load impedance in series with the nominal winding inductance. In one embodiment where an RL circuit is utilized, the relationship may set the measurement time delay times R/L approximately equal to 1.9. In one embodiment where an LC circuit is utilized, the relationship may set the measurement time delay divided by the square root of LC approximately equal to 2.4.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 4:
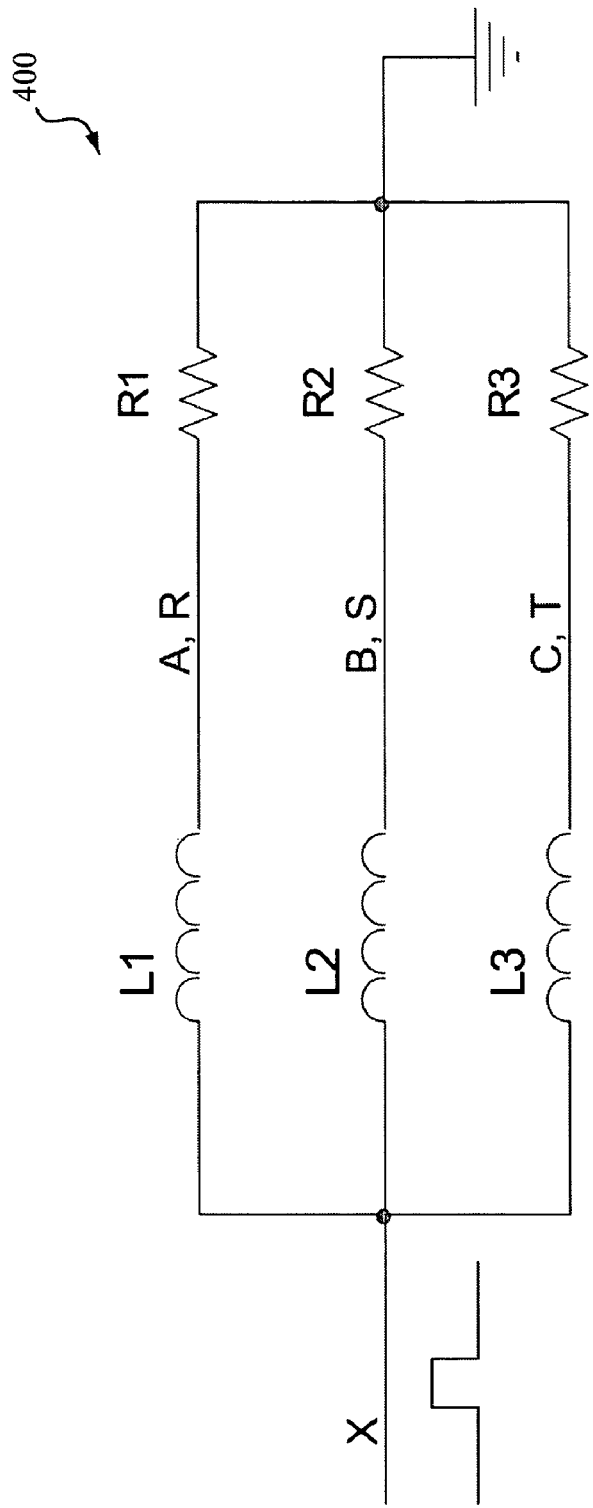
FIG. 4 is a schematic diagram of three variable inductance transducer windings arranged in a configuration which measures all three winding signals simultaneously utilizing a pulsed R/L circuit configuration in accordance with the present invention.

FIG. 4 is a schematic diagram of three variable inductance transducer windings arranged in a configuration which can measure all three winding signals simultaneously utilizing a pulsed R/L circuit configuration in accordance with the present invention. As shown in FIG. 4, the circuit 400 includes a first branch with a winding L1 in series with a resistor R1, a second branch with a winding L2 in series with a resistor R2, and a third branch with a winding L3 in series with a resistor R3. Circuit nodes in the middle of the three branches, between the windings and the resistors, are designated as nodes A, B and C, respectively (and in certain of the descriptions below are alternatively designated as nodes R, S and T respectively.) The three branches are coupled in parallel, with the inductors L1, L2 and L3 being coupled through a common node to a drive signal line X, and the resistors R1, R2 and R3 being coupled to ground through a common node.

In operation, the circuit 400 is an inductance measurement system where the three windings L1, L2 and L3 are driven by the common drive signal line X and each branch has a load impedance R1, R2 and R3 that creates a time domain response varying with the varying effective inductance associated with the transducer windings L1, L2 and L3, respectively. As will be described in more detail below, one advantage to using a three winding configuration is the ability to use signal processing techniques to cancel a third harmonic error component which may be present in the transducer measurement signals. After the principles for canceling the third harmonic error component are described below, additional description is provided of the various aspects of the operation of the three-winding variable inductance transducer 400 of FIG. 4.

The preferred signal processing techniques for the three-winding variable inductance transducer 400 are intended to cancel most of the third harmonic error component in the system. This type of signal processing is described in more detail in U.S. Pat. No. 6,859,762, which is commonly assigned and hereby incorporated by reference in its entirety. As described in the '762 patent, in a physical layout, three-phase windings such as windings L1, L2 and L3 are offset from each other along the measurement axis by ⅓ of a transducer spatial wavelength $\lambda$ (also referred to as the transducer scale pitch, or period.) In an ideal case, the amplitudes of the signals from the three receivers will be sinusoidal as a function of the transducer position along the measurement axis.

It will be appreciated that perfectly sinusoidal output functions are difficult to achieve in practice, (as will be described in more detail below with regard to FIG. 11) and that deviations from a perfect sinusoidal output contain spatial harmonics of the fundamental wavelength of the transducer. Such spatial harmonics are significant not only in systems such as the measurement system 400, but also in the measurement signals of nearly all multi-signal displacement transducers such as linear and rotary optical encoders, resolvers, synchro's, INDUCTOSYN® displacement transducers, and the like. Such spatial harmonics are a limiting factor in the accuracy of many such devices, and precise devices often incorporate special design features to reduce or eliminate these harmonics. Therefore, the three-phase configuration of this embodiment of the variable inductance transducer has a significant advantage over other embodiments of the transducer in that the third harmonic content in the separate receiver windings' signal can be largely eliminated as a source of position measurement error by certain signal processing techniques.

Eliminating the third harmonic may be accomplished, for example, by combining the outputs of the receiver windings. The following equations outline how the third harmonic component is eliminated by suitably combining three-phase measurement signals, designated as $U_R$, $U_S$, and $U_T$. If it is assumed that each of the unprocessed phase signals contains the fundamental sinusoidal signal plus the third harmonic signal, with equal amplitude in the three-phases, then:

$$U_R = A_0 \sin\left(2\pi \frac{x}{\lambda}\right) + A_3 \sin\left(2\pi \frac{3x}{\lambda}\right)$$

$$U_S = A_0 \sin\left(2\pi \frac{x + \frac{\lambda}{3}}{\lambda}\right) + A_3 \sin\left(2\pi \frac{3\left(x + \frac{\lambda}{3}\right)}{\lambda}\right)$$

$$= A_0 \sin\left(2\pi \frac{x}{\lambda} + \frac{2\pi}{3}\right) + A_3 \sin\left(2\pi \frac{3x}{\lambda} + 2\pi\right)$$

$$= A_0 \sin\left(2\pi \frac{x}{\lambda} + \frac{2\pi}{3}\right) + A_3 \sin\left(2\pi \frac{3x}{\lambda}\right)$$

-continued $$U_T = A_0 \sin\left(2\pi \frac{x - \frac{\lambda}{3}}{\lambda}\right) + A_3 \sin\left(2\pi \frac{3\left(x - \frac{\lambda}{3}\right)}{\lambda}\right)$$

$$= A_0 \sin\left(2\pi \frac{x}{\lambda} - \frac{2\pi}{3}\right) + A_3 \sin\left(2\pi \frac{3x}{\lambda} - 2\pi\right)$$

$$= A_0 \sin\left(2\pi \frac{x}{\lambda} - \frac{2\pi}{3}\right) + A_3 \sin\left(2\pi \frac{3x}{\lambda}\right)$$

When operations are performed to properly pair-wise subtract the above-outlined signals from each other, such operations can eliminate the third harmonic from the resulting signal, as indicated by the following equations:

$$V_R = U_T - U_S \qquad \text{Eq. 1}$$
$$= A_0\left(\sin\left(2\pi\frac{x}{\lambda} - \frac{2\pi}{3}\right) - \sin\left(2\pi\frac{x}{\lambda} + \frac{2\pi}{3}\right)\right)$$
$$= -A_0\sqrt{3}\cos 2\pi\frac{x}{\lambda}$$

$$V_S = U_R - U_T \qquad \text{Eq. 2}$$
$$= A_0\left(\sin\left(2\pi\frac{x}{\lambda}\right) - \sin\left(2\pi\frac{x}{\lambda} - \frac{2\pi}{3}\right)\right)$$
$$= A_0\sqrt{3}\cos\left(2\pi\frac{x}{\lambda} - \frac{2\pi}{6}\right)$$

$$V_T = U_S - U_R \qquad \text{Eq. 3}$$
$$= A_0\left(\sin\left(2\pi\frac{x}{\lambda} - \frac{2\pi}{3}\right) - \sin\left(2\pi\frac{x}{\lambda}\right)\right)$$
$$= A_0\sqrt{3}\cos\left(2\pi\frac{x}{\lambda} + \frac{2\pi}{6}\right)$$

Operations corresponding to the preceding equations can be performed using the present invention, by taking differential signal measurements between appropriate pairs of the signals $U_R$, $U_S$ and $U_T$, to determine the signal values of $V_R$, $V_S$ and $V_T$. Thus, the present invention is particularly useful for suppression of common-mode third harmonic content in the differential input signals, as described in greater detail below.

Circuits according to the systems and methods of this invention are advantageous in many important applications because the limited third harmonic type signal distortion that is introduced by the circuit is easily eliminated by subsequent signal processing. For example, returning to the previous discussion of a system with the three outputs ($U_S$, $U_T$, and $U_R$) of the three-phase windings, let us now assume that the signals $V_R$, $V_S$, and $V_T$ of EQUATIONS 1-3 each contain a previously unconsidered common-mode third harmonic distortion newly introduced by the signal processing circuitry. Such distortion is represented in the following equations, where the term $a_3$ is the amplitude of the third harmonic distortion:

$$V_{R-distort} = V_R + a_3\cos\left(2\pi \cdot \frac{3x}{\lambda}\right) \qquad \text{Eq. 4}$$

$$V_{S-distort} = V_S - a_3\cos\left(2\pi \cdot 3\left(\frac{x}{\lambda} - \frac{1}{6}\right)\right) \qquad \text{Eq. 5}$$
$$= V_S - a_3\cos\left(2\pi \cdot \frac{3x}{\lambda} - \pi\right)$$

$$V_{T-distort} = V_T - a_3\cos\left(2\pi \cdot 3\left(\frac{x}{\lambda} + \frac{1}{6}\right)\right) \qquad \text{Eq. 6}$$
$$= V_S - a_3\cos\left(2\pi \cdot \frac{3x}{\lambda} + \pi\right)$$

Fortuitously, in applications where a displacement is determined from three-phase signals such as $V_R$, $V_S$, and $V_T$, it is either convenient or necessary perform operations which derive quadrature signals from the three phase signals, that is, signals which bear the relationship of sine and cosine. Such signals may be determined as follows:

$$Q_{SINE} = \frac{1}{\sqrt{3}}(V_{S-distort} - V_{T-distort}) \qquad \text{Eq. 7}$$

$$= \frac{1}{\sqrt{3}}\left[V_S - V_T - a_3\begin{bmatrix}\cos\left(2\pi \cdot \frac{3x}{\lambda} - \pi\right) - \\ \cos\left(2\pi \cdot \frac{3x}{\lambda} + \pi\right)\end{bmatrix}\right] \qquad \text{Eq. 8}$$

$$= \frac{1}{\sqrt{3}}[V_S - V_T] \qquad \text{Eq. 9}$$

$$Q_{COSINE} = -\frac{1}{\sqrt{3}}(2V_{R\text{-}distort} - V_{S\text{-}distort} - V_{T\text{-}distort}) \qquad \text{Eq. 10}$$

$$= -\frac{1}{\sqrt{3}}\left[2V_R - V_S - V_T + a_3\begin{bmatrix}2\cos\left(\frac{6\pi x}{\lambda}\right) + \\ \cos\left(\frac{6\pi x}{\lambda} - \pi\right) + \\ \cos\left(\frac{6\pi x}{\lambda} + \pi\right)\end{bmatrix}\right] \qquad \text{Eq. 11}$$

$$= -\frac{1}{3}[2V_R - V_S - V_T] \qquad \text{Eq. 12}$$

It should be appreciated that the distortion terms associated with third harmonic signal processing distortion have been eliminated by the operations of EQUATIONS 7-12 and displacements calculated based on the results of EQUATIONS 7-12 will thus be free of common-mode third harmonic errors introduced by signal processing. Thus, it should be further appreciated that the particular combination of signal processing characteristics associated with the present invention are of particular advantage in a number of applications of circuits according to the systems and methods of this invention where signal processing or calculations may be used to remove common-mode third harmonic signal distortion, and more particularly in those applications where displacement determinations are calculated based on three-phase transducer signals.

Returning to the operation of the circuit 400 of FIG. 4, a circuit according to this invention may be driven with a changing voltage. In one embodiment, the changing voltage may be provided by an input pulse, such as a square wave pulse. A square wave pulse may be generated by switching a voltage source having a voltage V, which may be input through a winding L and a load impedance (resistance) R, to ground. The current in the winding is then:

$$i_L = \frac{V}{R}(1 - e^{-t\frac{R}{L}}) \qquad \text{Eq. 13}$$

And the winding voltage (the voltage across the load impedance) is:

$$v_L = V(1 - e^{-t\frac{R}{L}}) \quad \text{Eq. 14}$$

For the current drain requirement, the charge needed per sample with a $t_s$ pulse width is:

$$q_s = \int_0^{t_s} \frac{V}{R}(1 - e^{-t\frac{R}{L}})dt = \frac{V}{R}\left(t_s - \frac{L}{R}(1 - e^{-t_s\frac{R}{L}})\right) \quad \text{Eq. 15}$$

For the circuit 400, a pulse drives the three windings L1, L2 and L3. The variable inductance is measured by measuring the voltages across the resistors R1, R2 and R3 at the nodes A, B and C. The resulting measurement signal for each winding Li is:

$$v_{Li} = V(1 - e^{-t\frac{R}{Li}}) \quad \text{Eq. 16}$$

Figure 1:
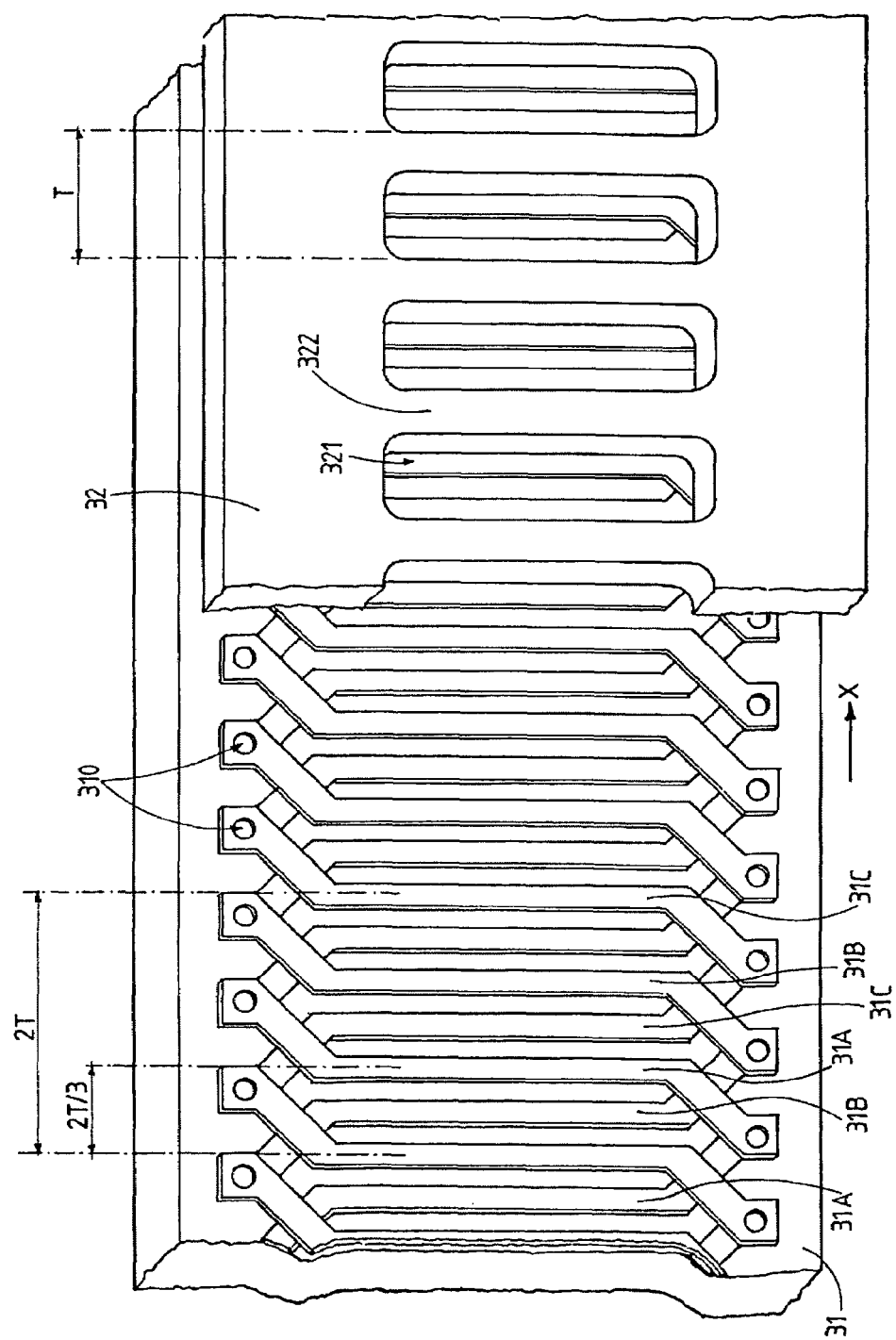
FIG. 1 is an isometric view of a prior art three-winding inductive transducer with an inductance modulating scale.
Figure 2:
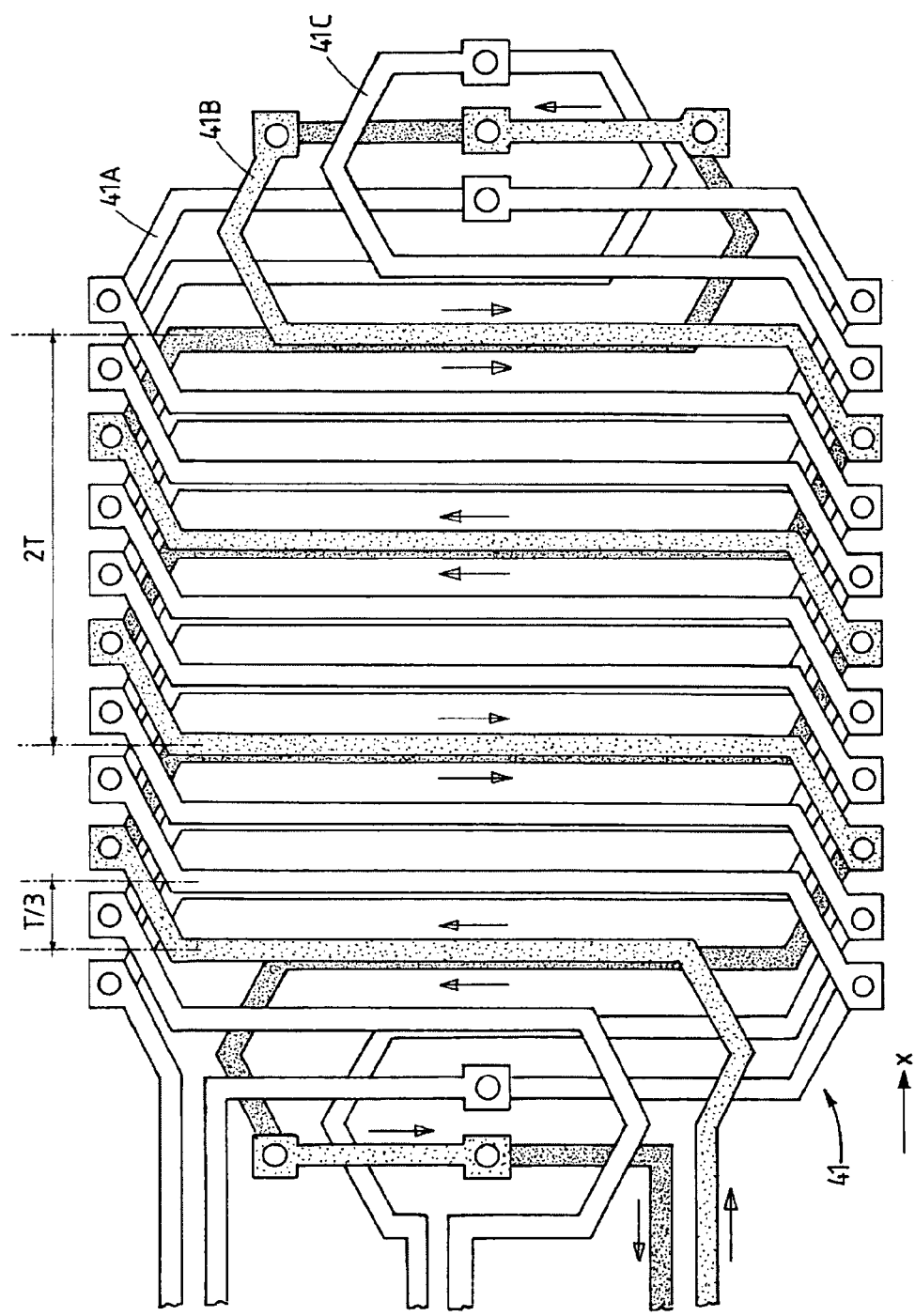
FIG. 2 is an plan view of an alternative prior art three-winding inductive transducer.
Figure 3:
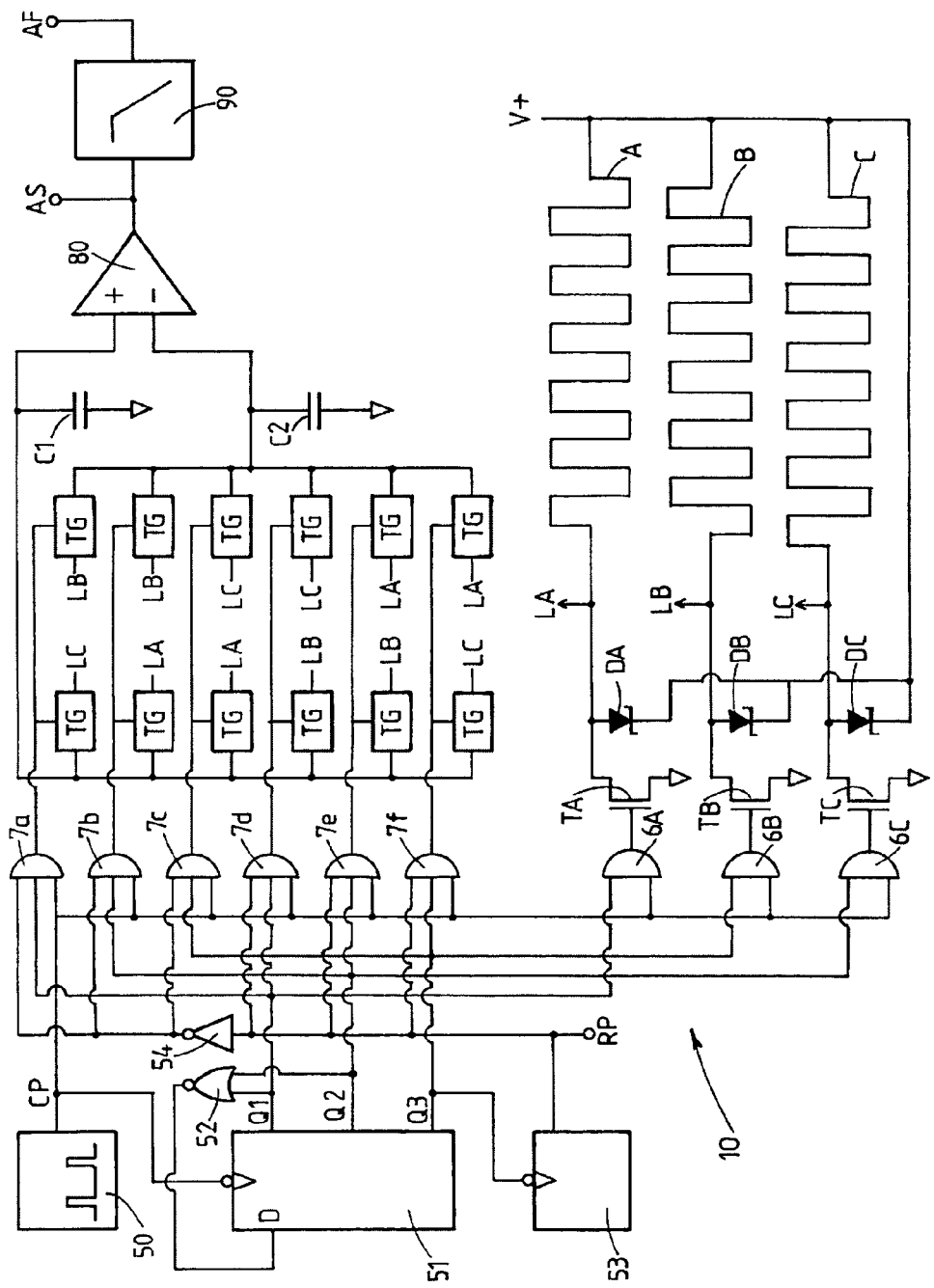
FIG. 3 is a schematic diagram of a prior art circuit for measuring displacement signals using a three-winding inductive transducer.

Such a system can be utilized to measure an effective inductance from either a variable inductance transducer, or a variable mutual inductance transducer (e.g. such as the caliper patterns illustrated in FIGS. 1 and 2 as described in the previously discussed '963 patent.) It will be appreciated that while the measuring circuitry of the present invention may be utilized with the caliper winding or coil patterns of the '963 patent, a different measuring principle may be applied according to this invention, wherein all three phases (windings) may be driven and measured simultaneously, as will be described in more detail below.

Figure 5:
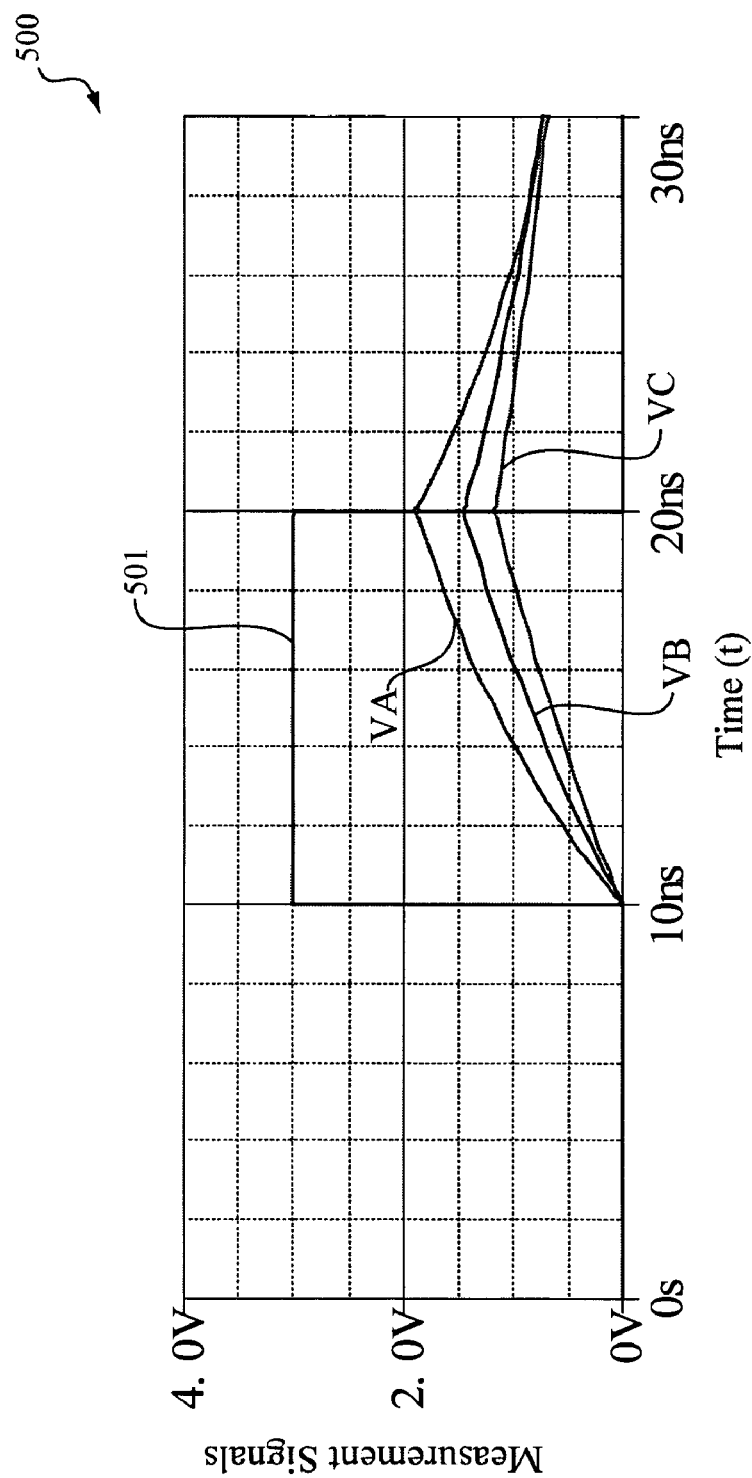
FIG. 5 is a graph illustrating the response to a square wave input pulse at various nodes of the circuit of FIG. 4.

FIG. 5 is a graph 500 illustrating the voltage response at the nodes A, B and C when a square wave pulse is applied by signal line X to the input node of the circuit 400 of FIG. 4. In FIG. 5, a 3V square wave pulse 501 is applied from time T=0 nS to time T=20 nS on the signal line X. Each of the voltages VA, VB and VC are shown to rise from 0 volts at time T=10 nS up to a maximum at time T=20 nS that depends on their associated inductance, and then are shown to decay following the end of the pulse at time T=20 nS.

One important aspect of the operation of the RL circuit configuration of FIG. 4 (and also for an LC pulsed circuit as will be described in more detail below with respect to FIG. 13) is that the measurement signal output (e.g., the voltage VA, VB, or VC) is not a linear function of the associated effective inductance. This means that the measurement signals provided by this type of measurement configuration will introduce harmonic errors, even assuming that the windings and scale of the transducer produce a perfectly sinusoidal inductance variation as a function of displacement. Errors associated with the second and third harmonics will be the dominant errors. Higher order error components may have relatively insignificant amplitudes for reasons described in the '963 patent.

As described above, a three-phase system such as the circuit 400 of FIG. 4 may utilize selected techniques to cancel third harmonic error components. However, a remaining concern is the second harmonic error component. The second harmonic arises in part, as illustrated by EQUATION 14 above, because the signal voltage is a non-linear function of inductance. As will be described in more detail below, when compared to a linear function fit to the non-linear voltage versus inductance curve, over one cycle from minimum to maximum inductance and back to minimum (one scale period), deviation from the linear approximation (the error) will reach a minimum twice and a maximum twice. That is, it will generate an error at a spatial frequency corresponding to twice the scale frequency—a second harmonic. The non-linearity associated with this second harmonic error arises in connection with the use of a component in series with each inductive winding, in order to facilitate an inductance measurement in a winding at the same time that it is being driven. This is an issue that did not arise in certain prior art circuits, such as the '963 circuit as described above, because such circuits do not sense a signal in a winding that is being driven, and do not use a series load impedance component. Therefore the second harmonic errors that are solved as one aspect of this invention did not arise, and were not considered by, prior art circuits such as that of the '963 patent.

In one embodiment, the second harmonic can be eliminated by using an even number of windings (phases), which provide pairs of complementary measurement signals (that is, 180 degrees out of phase). One example of this is a quadrature system with four phases, or two sets of complementary signals. When two complementary outputs are measured differentially, the result will be that even harmonic error components will be cancelled as common mode errors, and a dominant third harmonic error component will remain.

Since, as described above, the third harmonic non-linearity can be eliminated by signal processing in a three-phase system, in one embodiment, in order to minimize the effect of the harmonics on the system accuracy, a six phase system (3 pairs of complementary phases) may be utilized, with six windings. However, the six winding system may be too complex, large, or costly, to implement and manufacture for certain applications. Thus, a three-winding system, analogous to that shown in of FIG. 4, may be preferred with regard to complexity, size, and/or cost in certain instances. However, in such instances, it would still be desirable to eliminate the second harmonic error component, by some other means.

An inventive means of suppressing the second harmonic error component, according to one aspect of this invention, will now be described. It has been determined that when an RL winding configuration such as that shown in FIG. 4 is driven with a changing voltage, then for a given combination of inductance and resistance values there is a related measurement period—relative to the time of the initial application of the changing voltage to the input node—when the measurement signal voltage may be measured or sampled, and as a result of that particular measurement period the second harmonic error component will be suppressed over a typical range of transducer inductance variations. In one embodiment, if the changing voltage is provide by a square wave input pulse, then, the following equations may be utilized in certain embodiments for determining component values and measurement period values that will minimize or eliminate the second harmonic errors.

As previously described, for the circuit 400 of FIG. 4 driven by a square wave voltage pulse, for a given winding L the voltage at a time t is:

$$v_{Li} = V(1 - e^{-t\frac{R}{Li}}) \quad \text{Eq. 17}$$

In the following discussion, each of the transducer windings is assumed to have a nominal inductance value L, which may be their average effective inductance as arranged in the transducer, and the effective inductance variation due to the effect of the scale may be expressed as the peak-to-peak inductance variation relative to L, or:

$$\frac{PP}{\text{Nominal}} = \frac{L\max - L\min}{L} \qquad \text{Eq. 18}$$

The transducer is assumed to be 'perfect', meaning that the variation of inductance (or mutually inductance) with position is perfectly sinusoidal. The measurement period PW divided by the nominal time constant of the RL circuit may be utilized as a key characteristic of the RL circuit:

$$PW \cdot \frac{R}{L} \qquad \text{Eq. 19}$$

Figure 6:
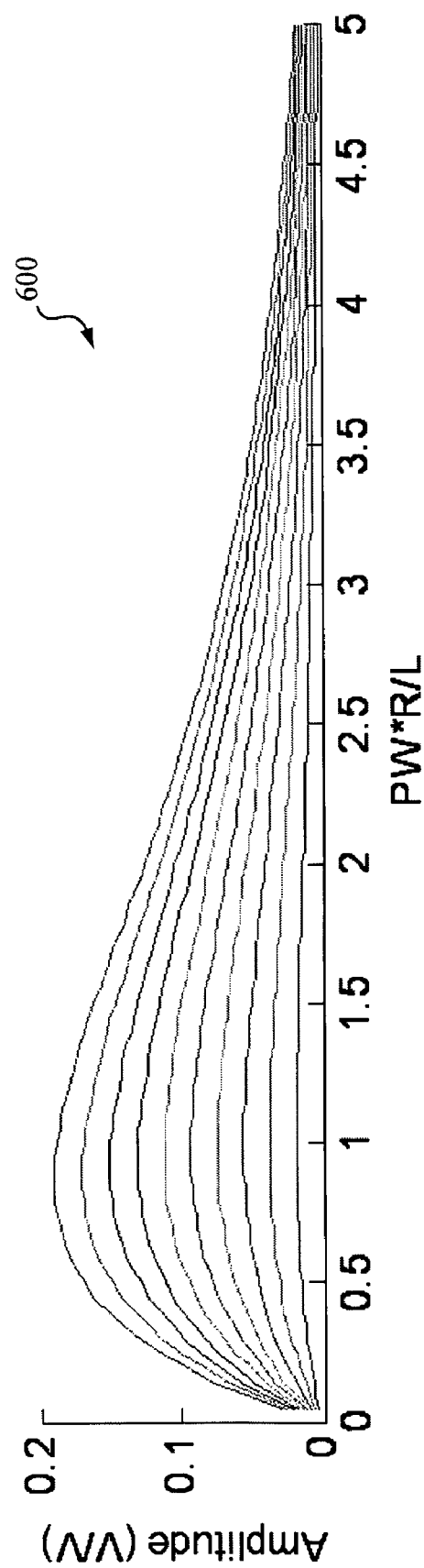
FIG. 6 is a graph illustrating the signal amplitude relative to the drive voltage versus the ratio of the pulse width times R/L for the circuit of FIG. 4.
Figure 7:
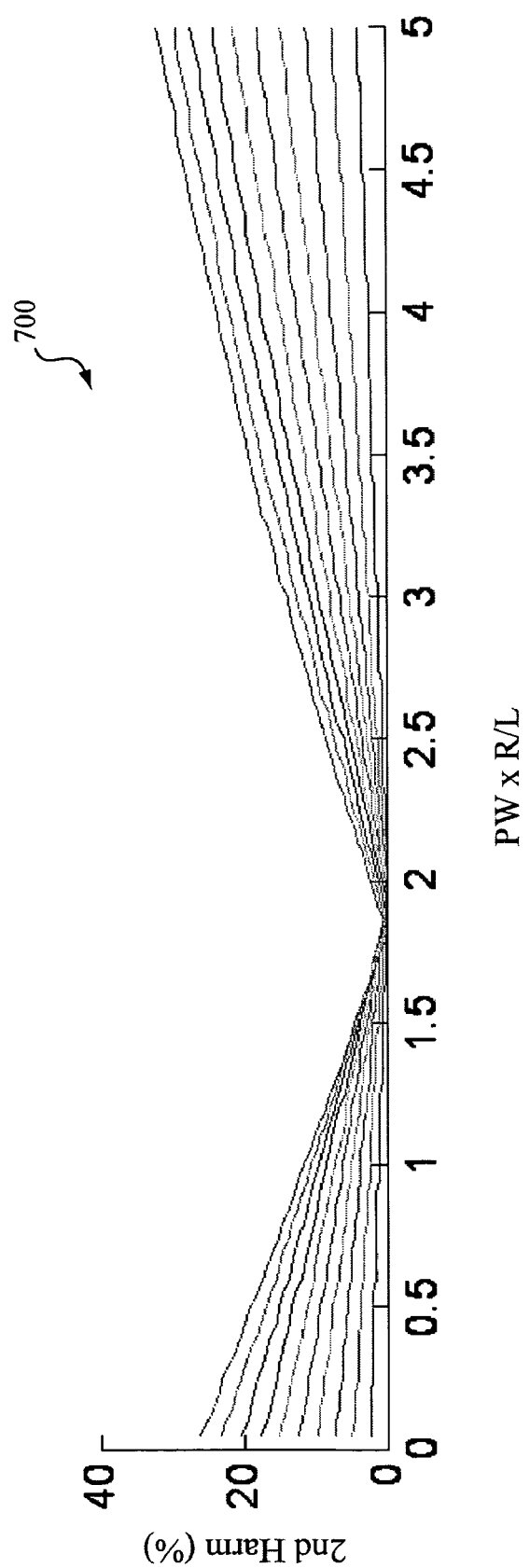
FIG. 7 is a graph illustrating the relative amplitude of the second harmonic in the measurement signal versus the ratio of the pulse width times R/L for the circuit of FIG. 4.
Figure 8:
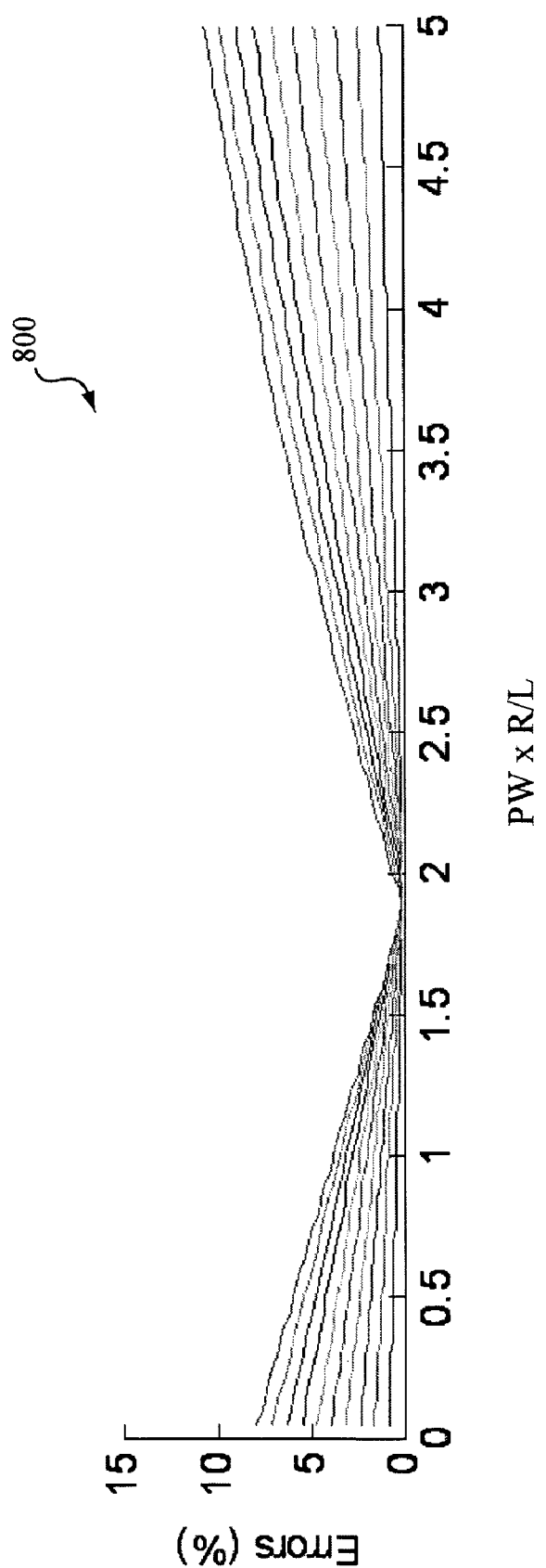
FIG. 8 is a graph illustrating the position errors relative to a transducer spatial wavelength versus the ratio of the pulse width times R/L for the circuit of FIG. 4.

In order to determine the optimal values of PW*(R/L) for suppressing the second harmonic error component for the circuit of FIG. 4, FIGS. 6, 7 and 8 are graphs illustrating the signal amplitude, second harmonic and error values for the circuit 400 of FIG. 4 versus the characteristic PW*(R/L). More specifically, FIG. 6 is a graph 600 illustrating measurement signal amplitude relative to the drive voltage (in V/V) versus the characteristic PW*(R/L). A family of curves is shown in FIG. 6. The family of curves represents a range of values for PP/Nominal from 10 to 100%, which exceeds the range of values that is likely to be encountered with typical variable inductance transducers. FIG. 7 is a graph 700 illustrating the amplitude of the second harmonic relative to that of the relative to the measurement signal magnitude, versus the characteristic PW*(R/L). The family of curves shown in FIG. 7 correspond to those shown in FIG. 6. FIG. 8 is a graph 800 illustrating the resulting maximum position errors relative to a transducer spatial wavelength versus the characteristic PW*(R/L). The family of curves shown in FIG. 8 correspond to those shown in FIGS. 6 and 7.

From FIGS. 7 and 8, it can be seen that the second harmonic and the resulting position errors are minimized at approximately PW*(R/L)=1.9. Furthermore, it is seen that the PW*(R/L) value corresponding to second harmonic minimum depends only slightly on PP/Nominal. That is, in this specific example implementation the PW*(R/L) value corresponding to the second harmonic minimum varies only from 1.85 to 2.0 over the simulated range, which is range much greater than the range of values that is likely to be encountered with typical variable inductance transducers. Thus, in a typical application, the PW*(R/L) value corresponding to second harmonic minimum will generally fall in an even more restricted range within the results shown in FIGS. 6-8. As may be determined with reference to FIG. 6, the PW*(R/L) value corresponding to the second harmonic minimum provides approximately 72% of the maximum possible signal amplitude. In application, L and R may be constrained by various design considerations, and the measurement period PW may be selected according to values established for L and R. In one embodiment, PW may be controlled to be at most (1.9 L/R)*1.5, and a least (1.9 L/R)*0.5, which as indicated by FIG. 8, will restrict position measurement errors due to the second harmonic error component to less than 5% of the transducer spatial wavelength, even for large values of PP/Nominal. The transducer spatial wavelength may be on the order of five millimeters in some applications, and for a second harmonic error component of 5%, at most, the second harmonic position errors may be approximately 250 micrometers, at most. In practice, PP/Nominal will generally fall much closer to 10% than to 100%, so according to FIGS. 7 and 8, in practice the second harmonic error component will generally be much smaller than the values discussed above, when PW is be controlled within the range just discussed.

In another embodiments, PW may be controlled to be at most (1.9 L/R)*1.25, and a least (1.9 L/R)*0.75, which as indicated by FIG. 8, will restrict position measurement errors due to the second harmonic error component to less than 3% of the transducer spatial wavelength and, with the PP/Nominal values of typical transducers, much less. In another embodiments, PW may be controlled to be at most (1.9 L/R)*1.1, and a least (1.9 L/R)*0.9, which as indicated by FIG. 8, will restrict position measurement errors due to the second harmonic error component to less than 1-2% of the transducer spatial wavelength and, with the PP/Nominal values of typical transducers, much less.

Figure 9A:
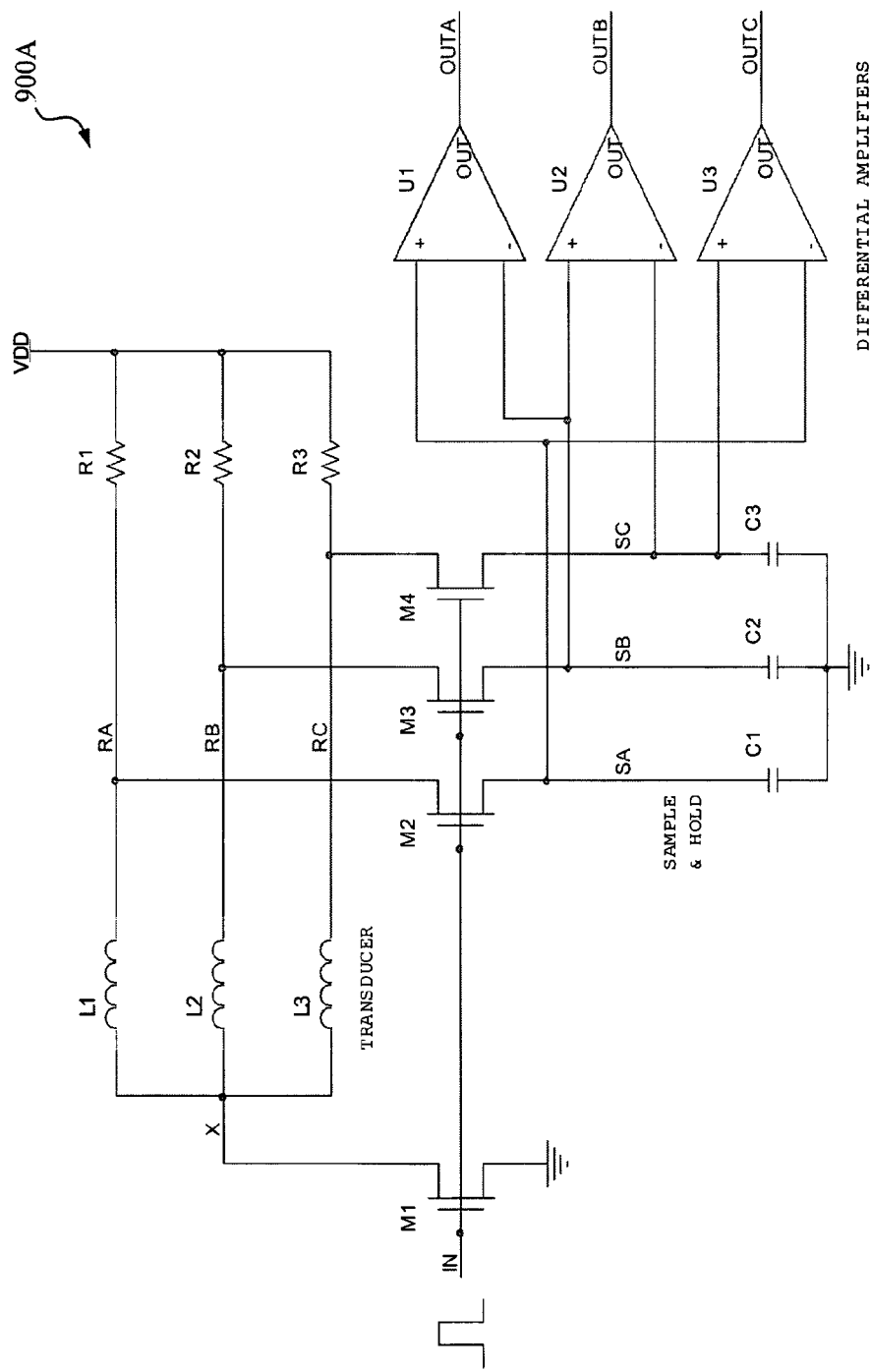
FIG. 9A is a schematic diagram of a detailed implementation of a three-winding variable inductance transducer utilizing a pulsed R/L circuit in accordance with the present invention.

FIG. 9A is a schematic diagram of a three-winding variable inductance transducer 900A utilizing an R/L circuit, which in one embodiment is a practical implementation analogous to the circuit 400 of FIG. 4. The circuit 900A includes three-windings L1, L2 and L3, which are each connected in series with resistors R1, R2 and R3, respectively. In this practical embodiment, in contrast to the circuit 400, the resistors R1, R2 and R3 share a common node that is connected to a voltage source VDD. Thus, the current flow in the RL circuit branches will be reversed compared to that of the circuit 400, but analogous measurement signals will be provided. Circuit nodes RA, RB and RC are designated between the respective windings and resistors. The windings L1, L2 and L3 share a common node that is coupled through a switchable or controllable transistor M1 to ground. Switching the transistor M1 to initiates a sudden voltage change at the common node shared by the windings L1, L2 and L3, effectively acting as a driver, causing current to flow from the voltage source VDD through the windings and their load resistors to ground. The transistor M1 is controlled by a signal line IN. The signal line IN also controls transistors M2, M3 and M4, which couple the circuit nodes RA, RB and RC to sample and hold capacitors C1, C2 and C3, respectively to provide measurement signal capturing portions of the circuit 900A. Differential outputs from the sample and hold signals SA, SB and SC from the sample and hold capacitors C1, C2 and C3 are provided on differential amplifiers U1, U2 and U3, which provide outputs OUTA, OUTB and OUTC, respectively. More specifically, the amplifier U1 receives as its inputs the sample and hold signals SA and SB from capacitors C1 and C2, and provides an output OUTA, while the amplifier U2 receives as its inputs the sample and hold signals SB and SC from the capacitor C2 and C3 and provides an output of OUTB, while the amplifier U3 receives as its inputs the sample and hold signals SC and SA from the capacitors C3 and C1 and provides as its output OUTC. The differential outputs OUTA, OUTB and OUTC may be seen to be analogous to the signals VR, VS and VT discussed previously with reference to EQUATIONS 1-3.

In operation, the windings L1, L2 and L3 are driven when the MOS transistor M1 is switched on. The measurement signals RA, RB and RC are sampled by the sample and hold capacitors C1, C2 and C3. The MOS transistors M2, M3 and M4 of the sample and hold circuit are driven by the same pulse signal IN as the transmitter transistor M1. The sampled signals SA, SB and SC are then amplified by the differential amplifiers U1, U2 and U3, creating a three-phase output. The differential amplifiers U1, U2 and U3 reject the common mode components of the sampled signals. It will be appreciated that this implementation of the variable inductance transducer 900A allows for a smaller driver size and associated cost with respect to other systems, as the RL pulsed system can tolerate relatively high driver resistances.

Figure 9B:
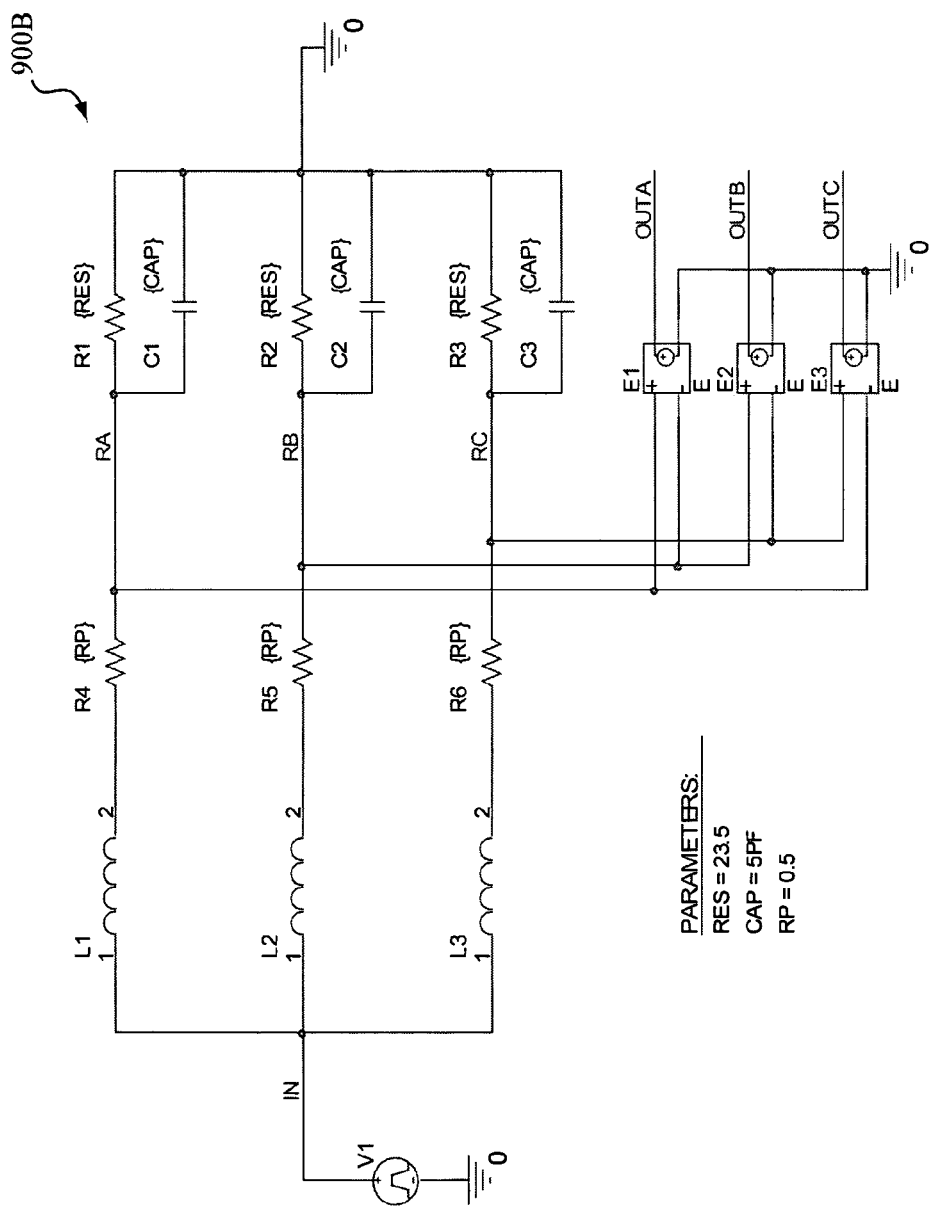
FIG. 9B is a schematic diagram of a simulated version of the three-winding variable inductance transducer of FIG. 9A for performing simulated measurements.

FIG. 9B is a schematic diagram 900B of a simulated version of the three-winding variable inductance transducer of FIG. 9A for performing simulated measurements. The components of the simulated circuit 900B are similar to the components of the circuit 900A, with the exception that additional resistors R4, R5 and R6 have been added to simulate the resistance of the windings L1, L2 and L3, and capacitors C1, C2 and C3 of circuit 900B have been added to simulate the effect of the sampling capacitors C1, C2 and C3 of circuit 900A, and the effect of parasitic capacitances related to the portions of the circuit where the resistors R1, R2 and R3 are coupled to ground. Differential voltage-controlled voltage sources E1, E2 and E3 are provided for simulating the outputs of the differential amplifiers U1, U2 and U3. In this simulated embodiment, in contrast to the circuit 900A, the resistors R1, R2 and R3 share a common node that is connected to ground, and a voltage signal is provided at the common input node of the windings L1, L2 and L3. Thus, the current flow in the RL circuit branches of the circuit 900B will be reversed compared to that of the circuit 900A, but analogous measurement signals will be provided. In one specific implementation used to generate the simulated values illustrated in FIGS. 10-12, values for the windings L1, L2 and L3 are set at a nominal value of approximately 126 nH. The voltage input is set at 1.0 V and an input pulse width is set at 10 nS with negligible rise and fall times. The value for the parasitic resistors R4, R5 and R6, is set to RP=0.5 ohms. The "sampling" and parasitic capacitor values for C1, C2 and C3 have a value of CAP=5 pf. The value of the load resistors R1, R2 and R3 is set at RES=23.5 ohms. The previously described winding and parasitic parameters are realistic values determined for a variable inductance transducer analogous to the types shown in FIGS. 1 and 2, and dimensioned for use in an electronic caliper, or linear or rotary encoder, or the like. The combination of the pulse width, RES, and CAP values, is determined as outlined previously and described in more detail below, to attempt to eliminate the second harmonic error component.

The following equations illustrate how the value of 23.5 ohms was selected as the optimum resistor value for second order harmonic cancellation. In the specific implementation described above for the circuit component values of FIG. 9B, with an average winding inductance of 126 nH and a 10 nS pulse width and utilizing the key characteristic value of 1.9 that was determined as described in relation to FIGS. 7 and 8 and EQUATION 19 above, the optimum resistor value for second harmonic cancellation is:

$$R = 1.9 \cdot \frac{L}{t_{pw}} = 1.9 \cdot \frac{126nH}{10nSec} = 24\Omega \qquad \text{Eq. 20}$$

Since the optimum resistor value for second order harmonic cancellation was determined to be 24 ohms, and since the windings L1, L2 and L3 of FIG. 9B were designated as having an inherent resistance of 0.5 ohms, the load resistors R1, R2 and R3 were select to have a value of 23.5 ohms. The inherent resistance of 0.5 ohms added to the load resistance of 23.5 ohms provides a total non-inductive impedance value that acts in series with the nominal inductance value.

Utilizing these component values, the operation of the circuit of FIG. 9B was simulated to generate the results described in more detail below with respect to FIGS. 10A, 10B, 11 and 12. For FIGS. 10A, 10B, 11, and 12, the respective signals RA, RB and RC are the measurement signals at their respective nodes in the circuit 900B, and the signals OUTA, OUTB and OUTC are the resulting differential outputs.

Figure 10A:
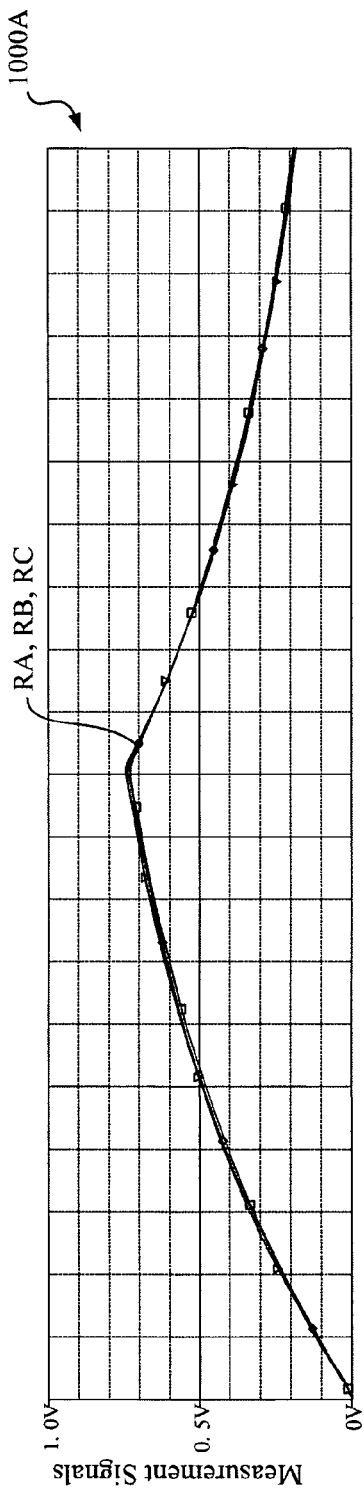
FIGS. 10A and 10B are timing diagrams illustrating measurement signal voltages and differential output voltages, respectively, in response to a driving pulse as applied to the circuit of FIG. 9B.
Figure 10B:
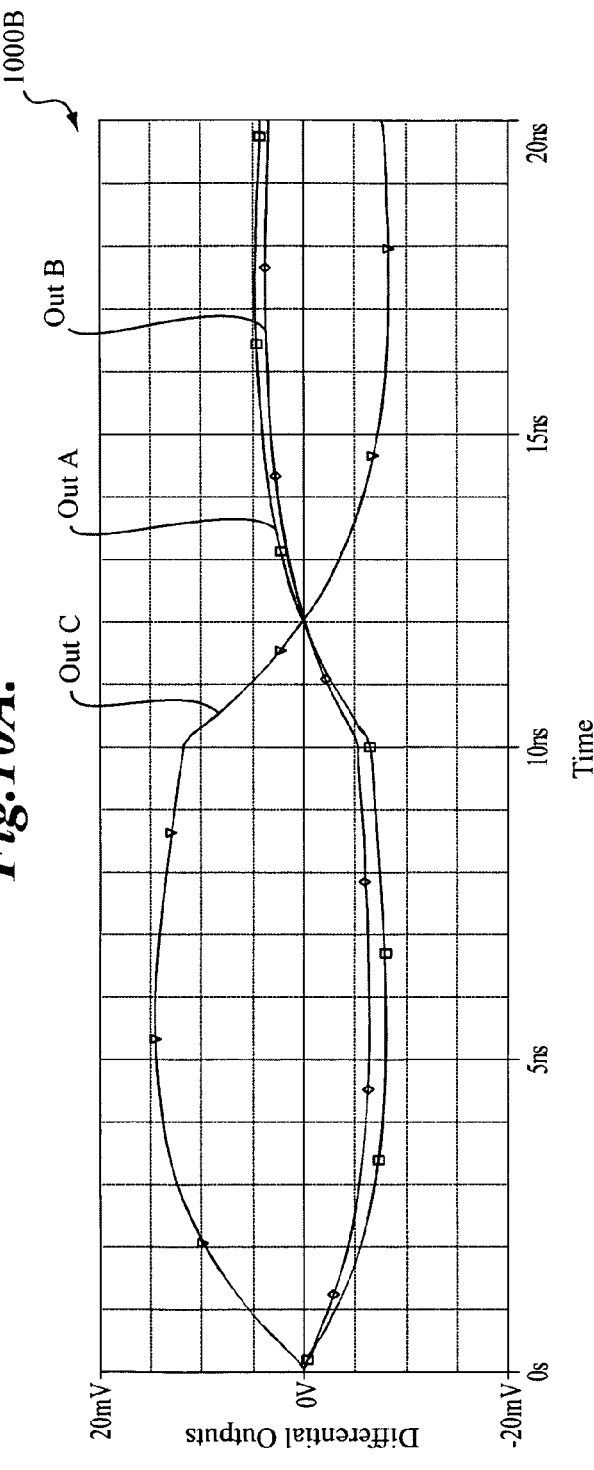

FIGS. 10A and 10B are timing diagrams 1000A and 1000B illustrating the signal voltages and differential output voltages, respectively, that result for a 1.0V, 10 nS, driving pulse as applied to the circuit of FIG. 9B. As shown in FIG. 10A, the measurement signals RA, RB and RC increase up to a maximum at the end of the 10 nS pulse, and then decay. The values for the signal outputs RA, RB and RC are very close to one another, which is typical for many variable inductance transducer systems of the type described previously, wherein relatively smaller measurement signal voltage variations (corresponding to relatively smaller inductance variations) occur around a relatively larger nominal voltage (corresponding to a relatively larger nominal inductance). As shown in FIG. 10B, the differential output voltages OUTA, OUTB and OUTC vary over approximately a 25 mV range.

Figure 11:
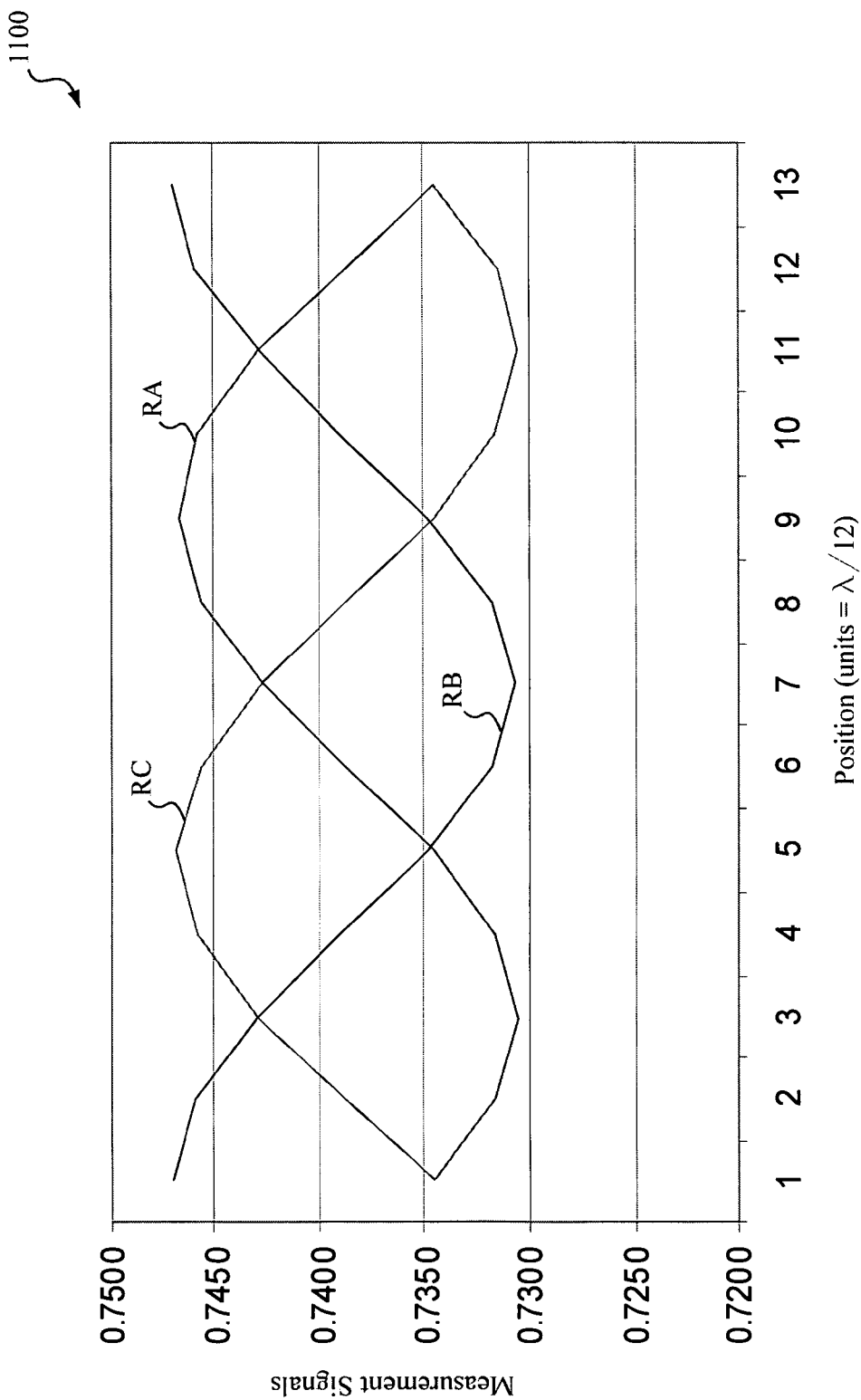
FIG. 11 is a graph illustrating the measurement signal voltages versus position as measured at the end of driving pulses as applied to the circuit of FIG. 9B at the various positions.

FIG. 11 is a graph 1100 illustrating the measurement signal voltages RA, RB and RC after a 10 nS measurement period versus transducer position for the circuit of FIG. 9B, assuming that the transducer windings and scale provide a sinusoidal inductance variation having a realistic amplitude, versus position. The a 10 nS measurement period coincides with the end of a 10 nS driving pulse in this example, and the results are simulated at twelve transducer positions over one transducer wavelength. As shown in FIG. 11, the repeated "10 nS" measurements of RA, RB and RC over the wavelength show a sinusoidal pattern of variation with respect to the position of the transducer and are offset from one another by approximately 120° of spatial phase.

Figure 12:
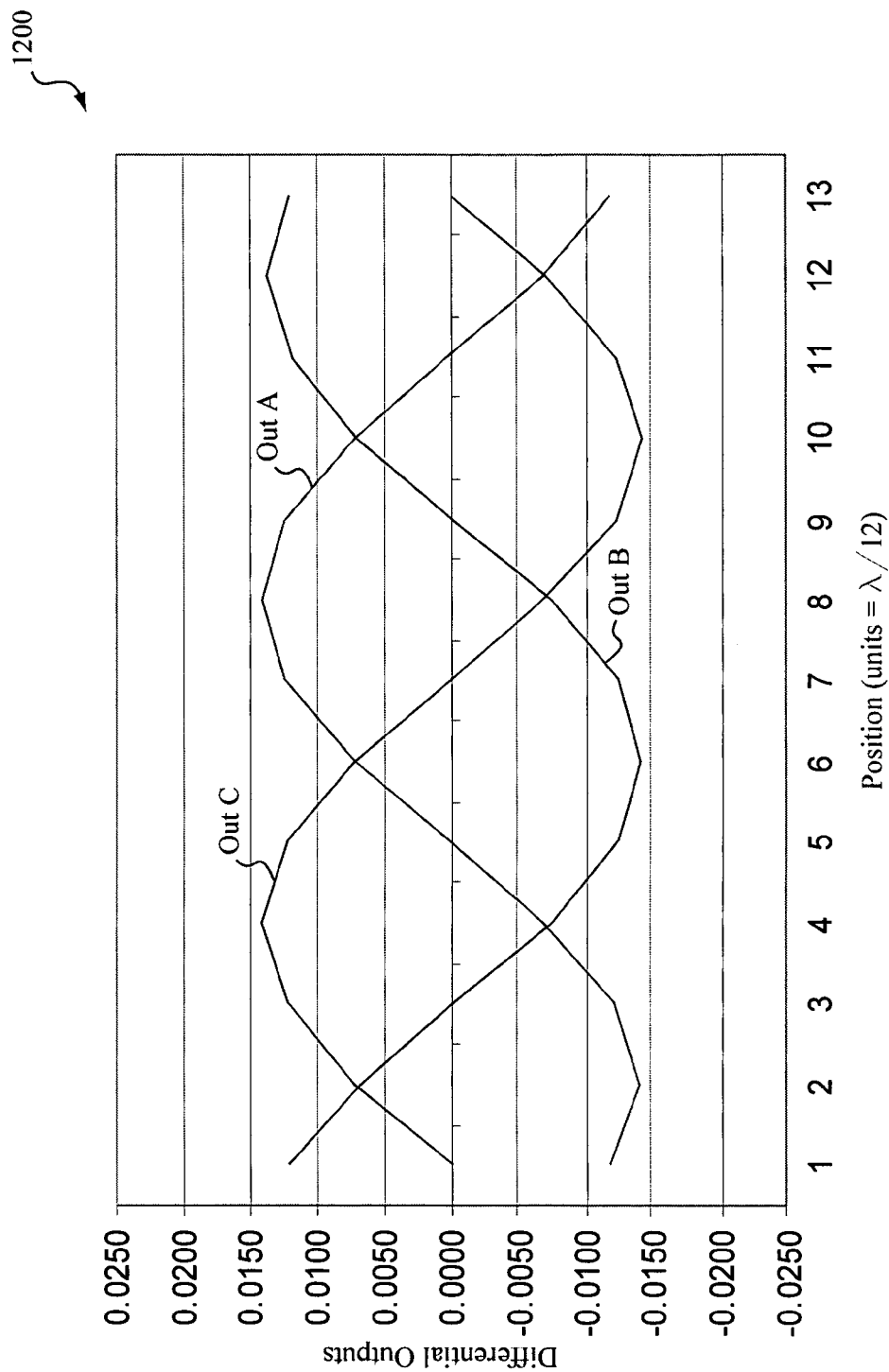
FIG. 12 is a graph illustrating the differential output voltages versus position as measured at the end of driving pulses as applied to the circuit of FIG. 9B at the various positions.

FIG. 12 is a graph 1200 illustrating the differential outputs OUTA, OUTB and OUTC after a 10 nS measurement period versus transducer position, corresponding the results shown in FIG. 11. The scale for the differential outputs is shown in volts, and the differential output voltages OUTA, OUTB and OUTC vary over approximately a 25 mV range. As shown in FIG. 12, the differential outputs OUTA, OUTB and OUTC vary in sinusoidal patterns with respect to the position of the transducer, and are offset from each one another by approximately 120° of spatial phase. The simulated results of FIGS. 11 and 12 have been analyzed to confirm that the selected relationship of values, corresponding approximately to PW*(R/L)=1.9, effectively suppress the second harmonic error as previously described.

An additional consideration for the circuit 900B of FIG. 9B is to determine the power consumption (i.e., the charge per sample needed to drive each branch of the circuit.) The charge per sample needed to drive each branch of the circuit is given by:

$$q_s = \frac{V}{R}\left(t_s - \frac{L}{R}\left(1 - e^{-t_s \frac{R}{L}}\right)\right) \qquad \text{Eq. 21}$$

If the optimum ratio for second harmonic cancellation is used (as was calculated above):

$$t_s \cdot \frac{R}{L} = 1.9 \qquad \text{Eq. 22}$$

(with $t_s$=PW, since sampling is done at the end of the pulse).

If the two equations are combined, the charge per sample can be calculated for the optimized 3-winding circuits, and utilizing the specific component values described above for the example embodiment of FIG. 9B:

$$q_{s3} = 0.872 \cdot t_s^2 \frac{V}{L}, \qquad \text{Eq. 23}$$

and, with V=3V, L=126 nH and $t_s$=10 nS, $$q_{s3} = 0.69 \text{ nC/sample} \qquad \text{Eq. 24}$$

Thus, the circuits and methods disclosed herein can provide extremely low power operation of typical variable inductance transducers used in portable electronic measuring instruments.

Figure 13:
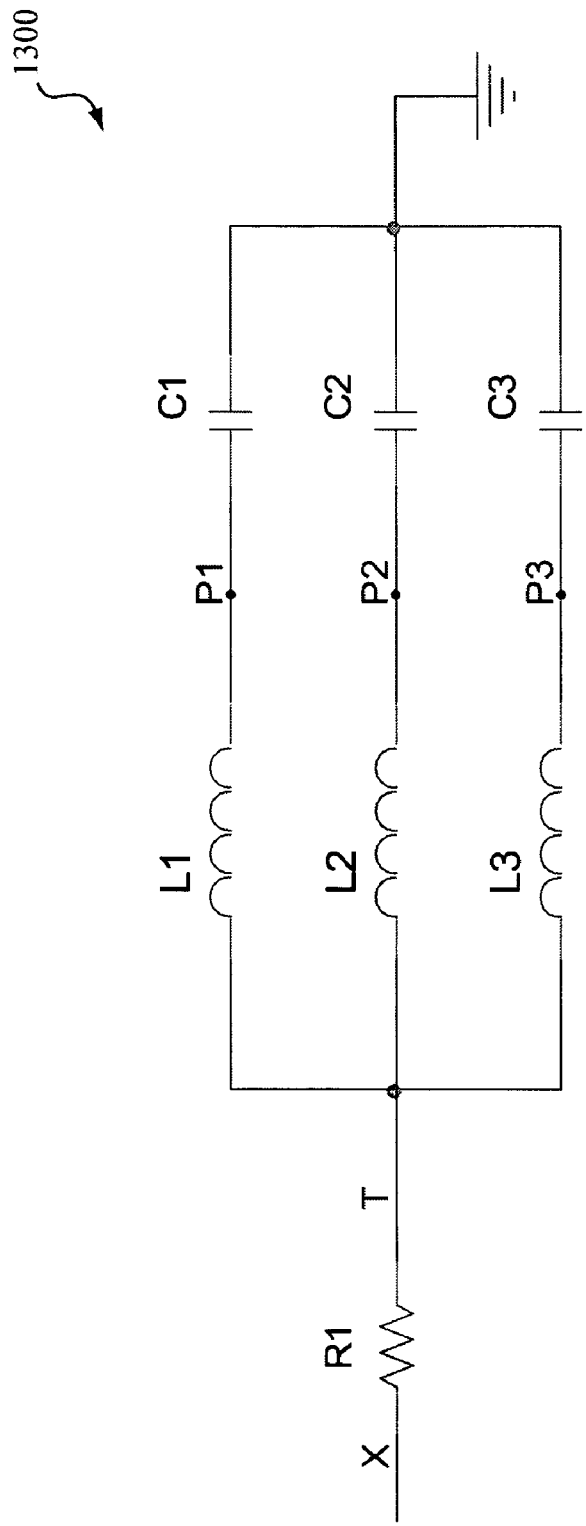
FIG. 13 is a schematic diagram of three variable inductance transducer windings arranged in a configuration which measures all three winding signals simultaneously utilizing a pulsed LC circuit configuration in accordance with the present invention.

FIG. 13 is a schematic diagram of three variable inductance transducer windings arranged in a variable inductance transducer configuration, circuit 1300, which can drive and measure all three winding signals simultaneously, utilizing an LC circuit configuration in accordance with the present invention. The LC circuit 1300 is similar to the RL circuit 400 of FIG. 4, with the exception that the load resistors have been replaced with load capacitors. It will be appreciated that the principles of the LC circuit 1300 described with respect to FIGS. 13-17 may be implemented in a practical circuit analogous to that shown in 9A, for example. As shown in FIG. 13, the circuit 1300 includes a first branch with a winding L1 in series with a capacitor C1, a second branch with a winding L2 in series with a capacitor C2, and a third branch with a winding L3 in series with a capacitor C3. Circuit nodes in the middle of the three branches, between the windings and the capacitors, are designated as nodes P1, P2 and P3, respectively. The three branches are coupled in parallel, with the inductors L1, L2 and L3 being coupled through a common node to a driver resistor R1 to a common signal line X, and the capacitors C1, C2 and C3 being coupled through a common node to ground. The value for the driver resistor R1 is an important factor, as it limits the maximum voltage possible in the circuit. Because of the potential for resonance, the receiver signal may potentially exceed the driving pulse voltage, so in various embodiment precautions are taken to keep the voltages within the IC power supply limits.

In operation, the circuit 1300 is an inductance measurement system wherein the three windings L1, L2 and L3 are driven by the common drive signal line X, and each branch has a load impedance C1, C2 and C3 that creates a time domain response varying with the effective inductance of the transducer windings. In one embodiment where the driver resistor R1 is relatively small, the measurement signal may exhibit approximately a cosine waveform.

Figure 14A:
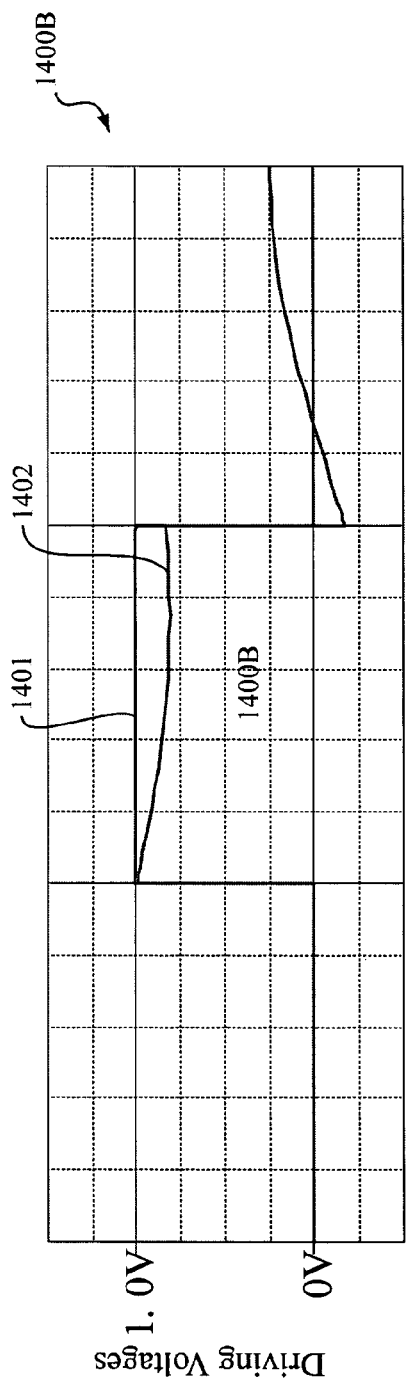
FIGS. 14A and 14B are timing diagrams illustrating the drive voltages and signal voltages in response to a driving pulse as applied to the circuit of FIG. 13.
Figure 14B:
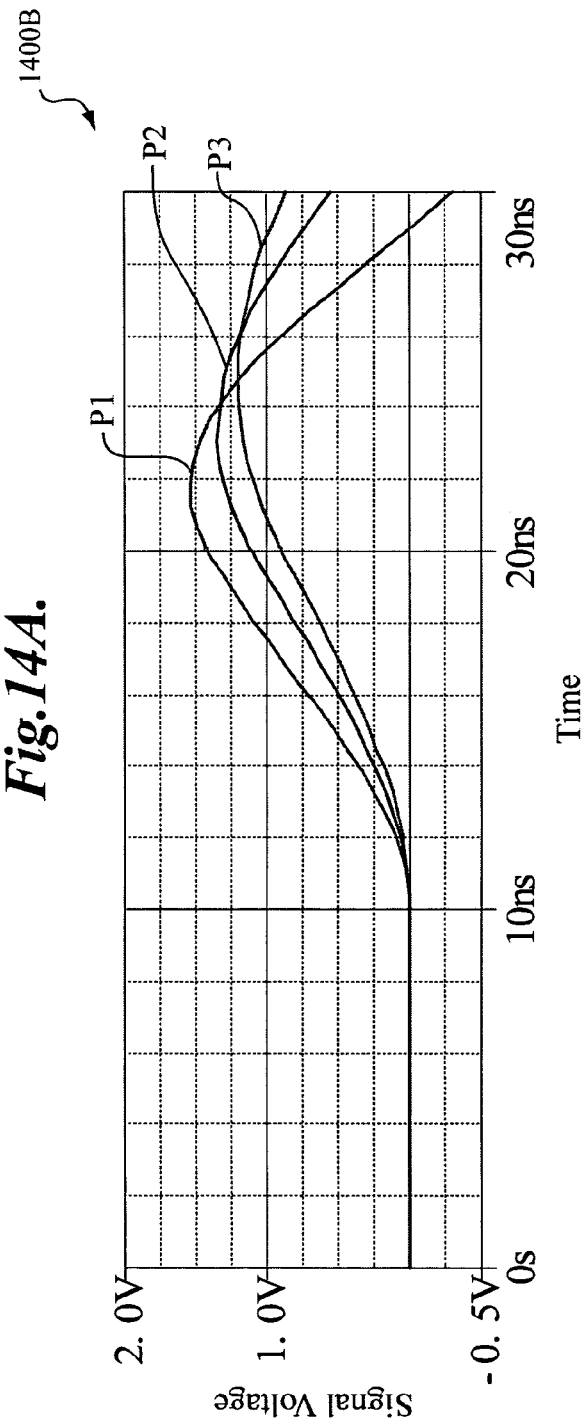

FIG. 14A shows a graph 1400A illustrating a drive voltage 1401 applied to the drive signal line X, and the resulting signal 1402 appearing at the common node input to the windings L1, L2 and L3. As shown in FIG. 14A, a 10 nS 1.0V pulse is supplied from time T=10 nS until time T=20 nS. FIG. 14B shows a graph 1400B illustrating the resulting measurement signal voltages at the nodes P1, P2 and P3 shown in FIG. 13. The measurement signal voltages rise from 0V at the time T=10 nS through the end of the input pulse at T=20 nS, and then continue to rise until reaching maximums and starting to drop down between time T=20 nS and time T=30 nS. The signals P1-P3 can be sampled and signal processed in a manner similar to that described previously.

It will be appreciated that the same type of optimization for suppressing a second harmonic error component can be done with an LC circuit configuration as was disclosed for the RL circuit, previously. The capacitance C provides a non-inductive impedance value that acts in series with the nominal inductance value. However, the key characteristic of the LC pulsed circuit is chosen to be:

$$PW \cdot \frac{1}{\sqrt{LC}} \qquad \text{Eq. 25}$$

Figure 15:
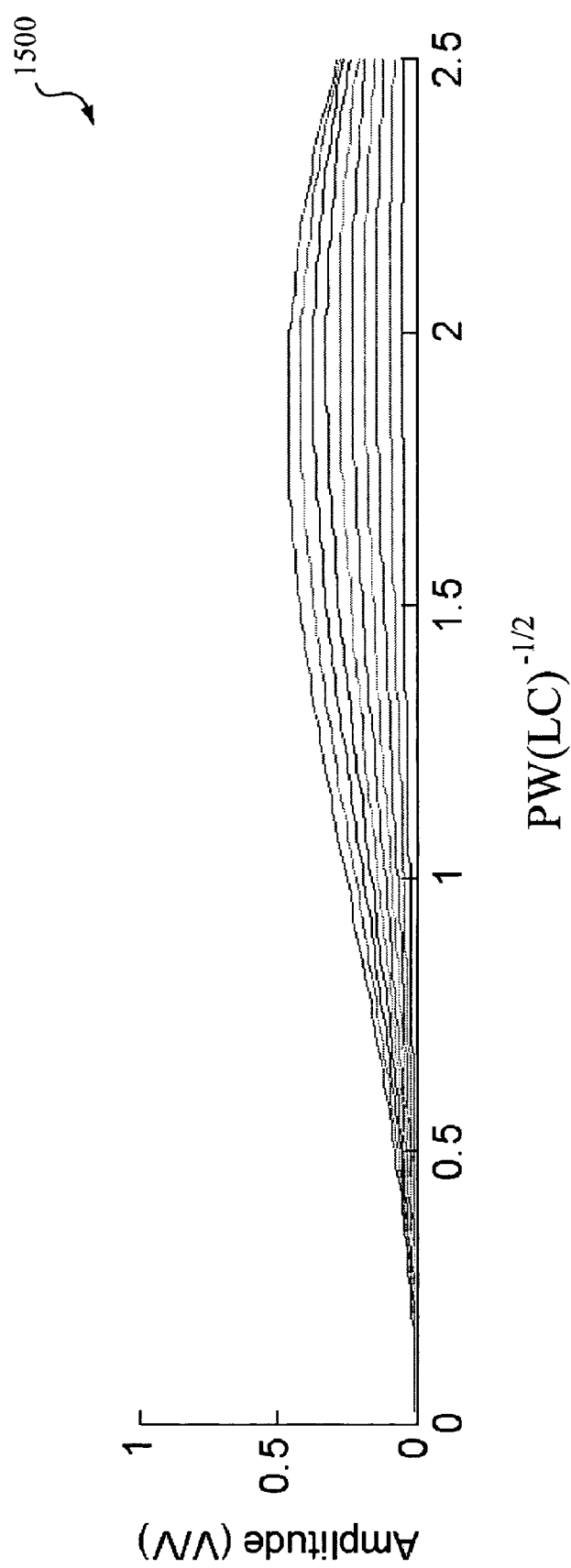
FIG. 15 is a graph illustrating signal amplitude relative to drive voltage versus the ratio of the pulse width divided by the square root of LC for the circuit of FIG. 13.
Figure 16:
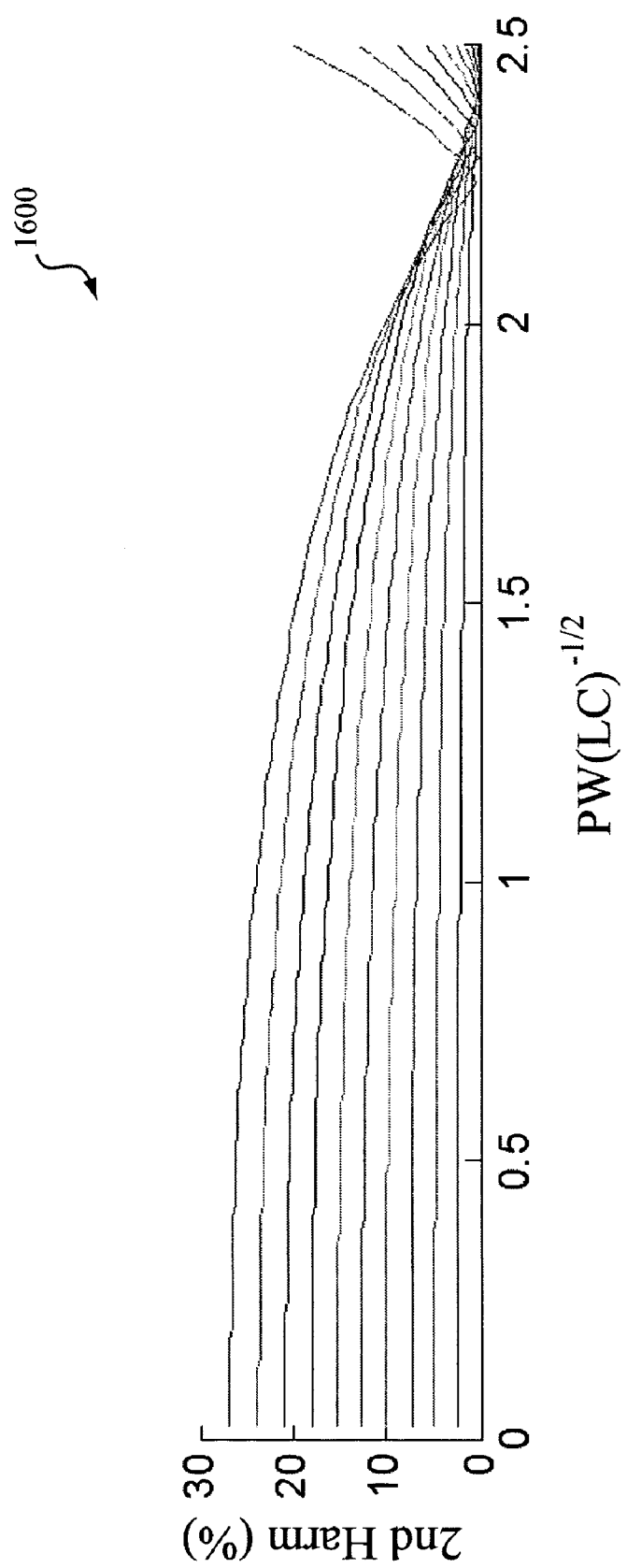
FIG. 16 is a graph illustrating the relative amplitude of the second harmonic in the measurement signal versus the ratio of the pulse width divided by the square root of LC for the circuit of FIG. 13.
Figure 17:
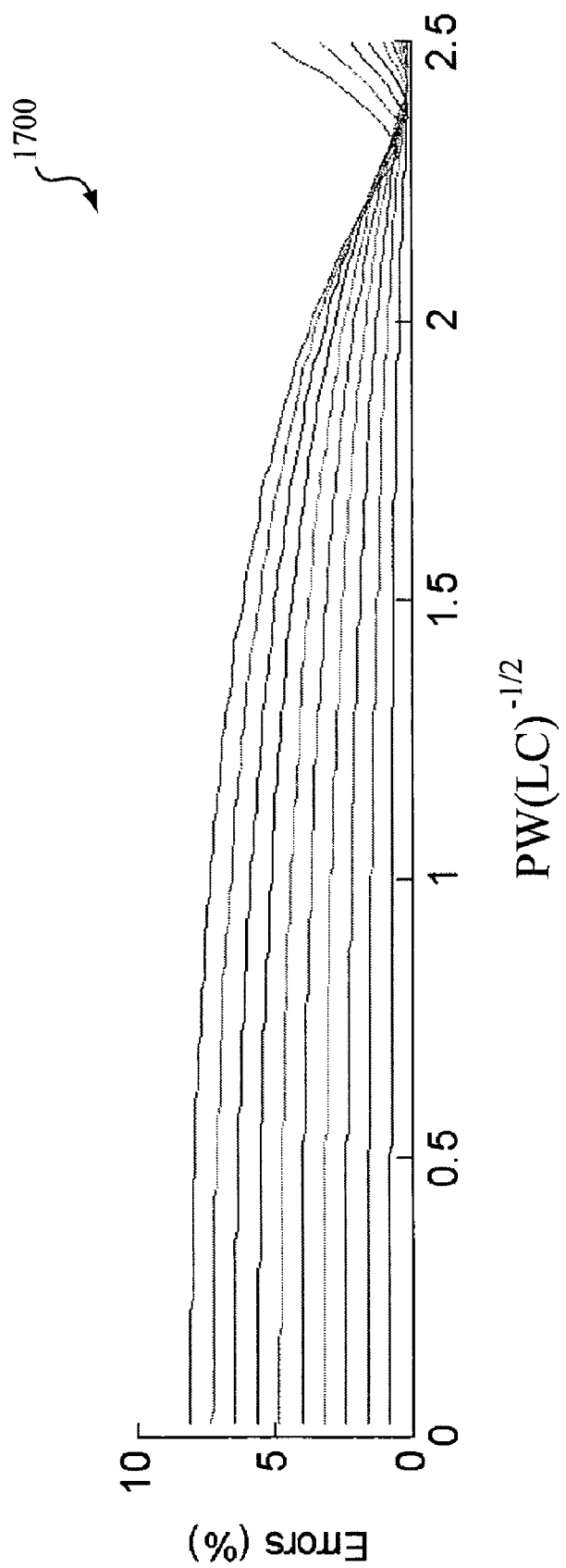
FIG. 17 is a graph illustrating the position errors relative to a transducer spatial wavelength versus the ratio of the pulse width divided by the square root of LC for the circuit of FIG. 13.

In order to determine the optimal values of $PW/(LC)^{1/2}$ for suppressing the second harmonic error component for LC-type variable inductance measuring circuits, FIGS. 15, 16 and 17 are graphs illustrating the signal amplitude, second harmonic, and error values for the circuit 1300 of FIG. 13 versus $PW/(LC)^{1/2}$. More specifically, FIG. 15 is a graph 1500 illustrating measurement signal amplitude relative to the drive voltage (in V/V) versus the characteristic $PW/(LC)^{1/2}=PW*(LC)^{-1/2}$. A family of curves is shown in FIG. 15. Similarly to FIG. 6, the family of curves represents a range of values for PP/Nominal inductance from 10 to 100%. FIG. 16 is a graph 1600 illustrating the amplitude of the second harmonic relative to the measurement signal magnitude, versus the characteristic $PW/(LC)^{1/2}$. The family of curves shown in FIG. 16 correspond to those shown in FIG. 15. FIG. 17 is a graph 1700 illustrating the resulting maximum position errors relative to a transducer spatial wavelength, versus the characteristic $PW/(LC)^{1/2}$.

From FIGS. 16 and 17, it can be seen that the second harmonic and the resulting position errors are minimized at approximately $PW/(LC)^{1/2}=2.35$, and depends slightly on PP/Nominal. That is, in this specific example implementation the $PW/(LC)^{1/2}$ value corresponding to the second harmonic minimum varies only from about 2.25 to 2.45 over the simulated range, which is range much greater than the range of values that is likely to be encountered with typical variable inductance transducers. Thus, in a typical application, the $PW/(LC)^{1/2}$ value corresponding to second harmonic minimum will generally fall in an even more restricted range within the results shown in FIGS. 15-17. Nevertheless, in comparison with the RL circuit configuration described previously, in an LC circuit configuration the second harmonic increases more rapidly around the minimum, resulting in a 'sharper' curve, particularly when the minimum is exceeded. This characteristic makes is desirable to control fabrication variations which may affect the PW/$(LC)^{1/2}$ value, since significant deviations may cause discernable measurement errors, and in some applications, due to its lower sensitivity to uncontrollable component value variations, the RL circuit configuration may be preferred. As may be determined with reference to FIG. 15, the $PW/(LC)^{1/2}$ value corresponding to the second harmonic minimum provides approximately a significant portion of the maximum possible signal amplitude.

In various practical applications, the PP/Nominal inductance value may be relatively low, L and C may be constrained by various design considerations, and the measurement period PW may be selected according to values established for L and C. In one embodiment, the PW may be controlled to be at most $[2.5*(LC)^{1/2}]$, and at least $[2.0*(LC)^{1/2}]$, which as indicated by FIG. 17, will restrict position measurement errors due to the second harmonic error component to on the order of 5% of the transducer spatial wavelength. In practice, PP/Nominal will generally fall much closer to 10% than to 100%, so according to FIG. 17, in practice, the second harmonic error component will generally be much smaller than 5% of the wavelength, when PW is be controlled within the range just discussed. In another embodiments, PW may be controlled to be at most $[2.4*(LC)^{1/2}]$, and at least $[2.1*(LC)^{1/2}]$, which as indicated by FIG. 17, will further restrict position measurement errors due to the second harmonic error component to less than approximately 3% of the transducer spatial wavelength and, with the PP/Nominal values of typical transducers, much less. In another embodiments, PW may be controlled to be at most at most $[2.35*(LC)^{1/2}]$, and at least $[2.25*(LC)^{1/2}]$, which as indicated by FIG. 17, will restrict position measurement errors due to the second harmonic error component to less than 1-2% of the transducer spatial wavelength and, with the PP/Nominal values of typical transducers, much less.

Although various embodiments herein have been described as being driven by a square wave pulse having a duration that coincides with the measurement period PW, such embodiments are exemplary only and not limiting. More generally, a measurement period PW can start with the beginning of a drive pulse, and end before the end of the drive pulse, when the sample and hold capacitor voltages of the previously described circuits are "held" for measurement, for example. In addition, the driver portion and the measurement signal capturing portions are not restricted to the configurations shown. Any suitable now-known or later-developed circuit portions that provide similar functions with sufficient accuracy may be used. In addition, the driver input signal profile need not be restricted to a square wave, although it will be appreciated that if a square wave pulse is not used, then the values of the characteristics PW*(R/L) or PW/(LC)$^{1/2}$ that will best suppress the second harmonic errors may change from those described above. However, in such a case, the optimum values may be determined by analysis, simulation or experiment that produces data similar to that presented in FIGS. 6-8 or FIGS. 15-16, using the desired driver input driver input signal profile.

It will be appreciated that the system of the present invention as described above is particularly advantageous in that a measuring circuit simultaneously drives a plurality of transducer windings and measures their inductance by using a load impedance in an inductance measurement circuit configuration. The system may be designed such that a circuit characteristic that includes a measurement period value, a winding inductance value, and a load impedance value is set at a nominal value that best or adequately suppresses a second harmonic error component that is inherent in the measuring circuit. In one advantageous embodiment, the measurement period may coincide with the duration of a square wave input pulse, which eliminates the need for a special timing circuit, in that the measurement period may be synchronized with and/or set by the duration of a square wave input pulse. When a three-phase winding configuration is used, preferred signal processing techniques may be used to cancel third harmonic errors in the system, which in combination with the second harmonic error suppression technique previously described creates a variable inductance measurement system that minimizes the number of windings required, can perform simultaneous measurement of all windings, and is simple, fast, and relatively free from errors.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An inductive displacement sensor comprising:
    first and second elements arranged to be movable relative to each other along at least a first measuring axis, the first element comprising a set of at least two respective windings arranged along the first measuring axis, the second element comprising a structure having electromagnetic characteristics that are spatially periodic along the first measuring axis, wherein the respective effective inductance of each respective winding varies periodically as a function of the relative displacement of the two elements along the first measuring axis; and
    a measurement circuit comprising a driver and at least two respective measurement signal capturing portions;
    wherein:
    a first end of each respective winding is connected to a first circuit node;
    a second end of each respective winding is connected to a respective measurement signal capturing portion and the first terminal of a respective series component;
    the second terminal of each respective series component is connected to a second circuit node;
    the driver is connected to the first circuit node and adapted to generate simultaneous time-varying signals at the second end of each respective winding;
    the respective signal capturing portions are adapted to capture respective measurement signals arising from the simultaneous time-varying signals; and
    the displacement sensor is configured such that a combination of values comprising a measurement period value of the measurement circuit, a nominal inductance value of the respective windings, and a non-inductive impedance value that acts in series with the nominal inductance value, cause a second spatial harmonic error component of the inductive displacement sensor to be suppressed.

2. The displacement sensor of claim 1, wherein the respective signal capturing portions are adapted to capture the respective measurement signals simultaneously.

3. The displacement sensor of claim 1, wherein the nominal values of the measurement period value, the inductance value of the respective windings, and the non-inductive impedance value that acts in series with the inductance value, nominally suppresses the second spatial harmonic error component to its minimum value.

4. The displacement sensor of claim 1, wherein the second spatial harmonic error component of the inductive displacement sensor may be expressed as a position error, and the position error may be expressed as a percentage of a spatial wavelength of the displacement sensor, and the combination of values suppresses the second spatial harmonic error component position error to be at most 5% of the spatial wavelength of the displacement sensor.

5. The displacement sensor of claim 1, wherein the driver comprises a switch operable to cause a sudden voltage change at the first circuit node.

6. The displacement sensor of claim 5, wherein a voltage supply is connected to the second circuit node and the switch operates to connect the first circuit node to ground.

7. The displacement sensor of claim 5, wherein the switch is connected to a control line and a square wave control signal is applied to the switch to cause the sudden voltage change.

8. The displacement sensor of claim 7, wherein the measurement period value characterizes a measurement period of the measurement circuit, and the measurement period is synchronized with the square wave control signal.

9. The displacement sensor of claim 1, wherein the driver initiates a sudden voltage change at the first circuit node to begin generating the simultaneous time-varying signals, each respective series component comprises a respective series capacitor with a capacitance of approximately C, the nominal inductance of each respective winding is approximately L, and the respective signal capturing portions are adapted to capture respective measurements signals at a time T after the driver initiates the sudden voltage change, and T is at most (2.5*square root of LC), and at least (2.0*square root of LC).

10. The displacement sensor of claim 9, wherein T is at most (2.4*square root of LC), and at least (2.1*square root of LC).

11. The displacement sensor of claim 9, wherein T is at most (2.35*square root of LC), and at least (2.2.25*square root of LC).

12. The displacement sensor of claim 9, wherein T is nominally (2.35*square root of LC).

13. An inductive displacement sensor comprising:
first and second elements arranged to be movable relative to each other along at least a first measuring axis, the first element comprising a set of at least two respective windings arranged along the first measuring axis, the second element comprising a structure having electromagnetic characteristics that are spatially periodic along the first measuring axis, wherein the respective effective inductance of each respective winding varies periodically as a function of the relative displacement of the two elements along the first measuring axis; and
a measurement circuit comprising a driver and at least two respective measurement signal capturing portions;
wherein:
a first end of each respective winding is connected to a first circuit node;
a second end of each respective winding is connected to a respective measurement signal capturing portion and the first terminal of a respective series component comprising a respective series resistor having a resistance;
the second terminal of each respective series component is connected to a second circuit node;
the driver is connected to the first circuit node and adapted to generate simultaneous time-varying signals at the second end of each respective winding by initiating a sudden voltage change at the first circuit node to begin generating the simultaneous time-varying signals;
the respective signal capturing portions are adapted to capture respective measurement signals arising from the simultaneous time-varying signals; and
an inherent series resistance of each respective winding added to the resistance of each respective series resistor totals approximately R, the nominal inductance of each respective winding is approximately L, and the respective signal capturing portions are adapted to capture the respective measurement signals at a time T after the driver initiates the sudden voltage change, and T is at most (1.9 L/R)*1.5, and a least (1.9 L/R)*0.5.

14. The displacement sensor of claim 13, wherein T is at most (1.9 L/R)*1.25, and at least (1.9 L/R)*0.75.

15. The displacement sensor of claim 13, wherein T is at most (1.9 L/R)*1.1, and at least (1.9 L/R)*0.9.

16. The displacement sensor of claim 13, wherein T is nominally 1.9 L/R.

17. The displacement sensor of claim 13, wherein the driver and the respective signal capturing portions are included in an integrated circuit, and the time T depends at least partially on a resistor that is fabricated using the same processing steps as those used to fabricate the respective series resistors.

18. The displacement sensor of claim 13, wherein the driver comprises a switch operable to cause the sudden voltage change at the first circuit node, the switch is connected to control line and a square wave control signal is applied to the switch to initiate the sudden voltage change, and the time T coincides with the end of the square wave control signal.

19. An inductance measuring circuit for use with a variable inductance displacement sensor comprising a plurality of respective windings that each have a respective nominal inductance value, the measuring circuit comprising a driver, at least two respective measurement signal capturing portions, and at least two respective load impedance components,
wherein:
the driver is connected to a first circuit node of the measuring circuit that is connected to at least one first-node connection point of the measuring circuit;
each respective measurement signal capturing portion is connected to a first terminal of a respective load impedance component and to a respective individual winding connection point of the measuring circuit;
a second terminal of each respective load impedance component is connected to a second circuit node of the measuring circuit; and
the measuring circuit is configured such that:
when the measuring circuit is connected to the variable inductance displacement sensor such that a first terminal of each respective winding is connected to the first node connection point of the measuring circuit, and a second terminal of each respective winding is connected to a respective individual winding connection point of the measuring circuit, the measuring circuit is operable to generate simultaneous time-varying signals at the first terminal of each respective load impedance component and to capture respective measurement signals arising from the simultaneous time-varying signals using the respective signal capturing circuits, each respective measurement signal indicative of the effective inductance of a respective winding; and
a combination of values comprising a measurement period value of the measurement circuit, a nominal inductance value of the respective windings, and a non-inductive impedance value that acts in series with the nominal inductance value, cause a second spatial harmonic error component of the inductive displacement sensor to be suppressed.

20. The inductance measuring circuit of claim 19, wherein the respective signal capturing circuits are adapted to capture the respective measurement signals simultaneously at a time determined by the measurement period value.

* * * * *

UNITED STATES PATENT AND TRADEMARK OFFICE
CERTIFICATE OF CORRECTION

PATENT NO. : 7,323,863 B2
APPLICATION NO. : 11/251482
DATED : January 29, 2008
INVENTOR(S) : P. Mawet Page 1 of 1

It is certified that error appears in the above-identified patent and that said Letters Patent is hereby corrected as shown below:

| COLUMN | LINE | ERROR |
|---|---|---|
| 19 (Claim 9, | 18 line 8) | "measurements signals" should read --measurement signals-- |
| 19 (Claim 11, | 26 line 2) | "(2.2.25*square" should read --(2.25*square-- |

Signed and Sealed this

Twenty-first Day of July, 2009

JOHN DOLL
*Acting Director of the United States Patent and Trademark Office*